United States Patent
Veernapu et al.

(10) Patent No.: US 10,049,607 B2
(45) Date of Patent: Aug. 14, 2018

(54) COLOR SPACE CONVERSION LOGIC HAVING REDUCED CONVERSION ERROR

(71) Applicant: Intel Corporation, Santa Clara, CA (US)

(72) Inventors: Kiran Chand Veernapu, Bangalore (IN); Arijit Mukhopadhyay, Bangalore (IN); VijayKumar Donthireddy, Bengaluru (IN); Durgesh Borkar, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 76 days.

(21) Appl. No.: 15/016,797

(22) Filed: Feb. 5, 2016

(65) Prior Publication Data

US 2017/0229052 A1  Aug. 10, 2017

(51) Int. Cl.
| | |
|---|---|
| G09G 3/20 | (2006.01) |
| G06F 3/14 | (2006.01) |
| G09G 5/00 | (2006.01) |
| G09G 5/04 | (2006.01) |
| G09G 5/36 | (2006.01) |

(52) U.S. Cl.
CPC ......... *G09G 3/2003* (2013.01); *G06F 3/1407* (2013.01); *G09G 5/001* (2013.01); *G09G 5/04* (2013.01); *G09G 5/363* (2013.01); *G09G 2340/06* (2013.01); *G09G 2350/00* (2013.01); *G09G 2360/08* (2013.01); *G09G 2360/121* (2013.01)

(58) Field of Classification Search
None
See application file for complete search history.

(56) References Cited

U.S. PATENT DOCUMENTS

| | | |
|---|---|---|
| 6,542,185 B1 | 4/2003 | Bogardus |
| 7,414,632 B1 | 8/2008 | Piazza et al. |
| 7,659,911 B2 | 2/2010 | Wittenstein |
| 2003/0201994 A1* | 10/2003 | Taylor ............... G09G 5/02 345/581 |
| 2007/0103487 A1 | 5/2007 | Watson et al. |
| 2016/0321774 A1* | 11/2016 | Liang ................. G06T 1/20 |
| 2017/0098026 A1* | 4/2017 | Ew ................... G06F 17/5081 |

OTHER PUBLICATIONS

Yuv. (Jan. 5, 2016). Retrieved Aug. 31, 2017, from https://en.wikipedia.org/w/index.php?title=YUV&oldid=698329226.*

* cited by examiner

*Primary Examiner* — Vu Nguyen
(74) *Attorney, Agent, or Firm* — Womble Bond Dickinson (US) LLP

(57) ABSTRACT

Embodiments provide for a graphics processing apparatus comprising a graphics processing unit having fixed point logic to convert YUV encoded image data to RGB encoded image data. In one embodiment the fixed point logic includes a set of fixed function logic circuits to compute a set of fixed point approximations of specified floating point color space conversion coefficients during the conversion of the YUV encoded image date to the RGB encoded image data.

19 Claims, 19 Drawing Sheets

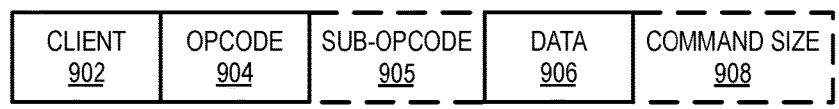
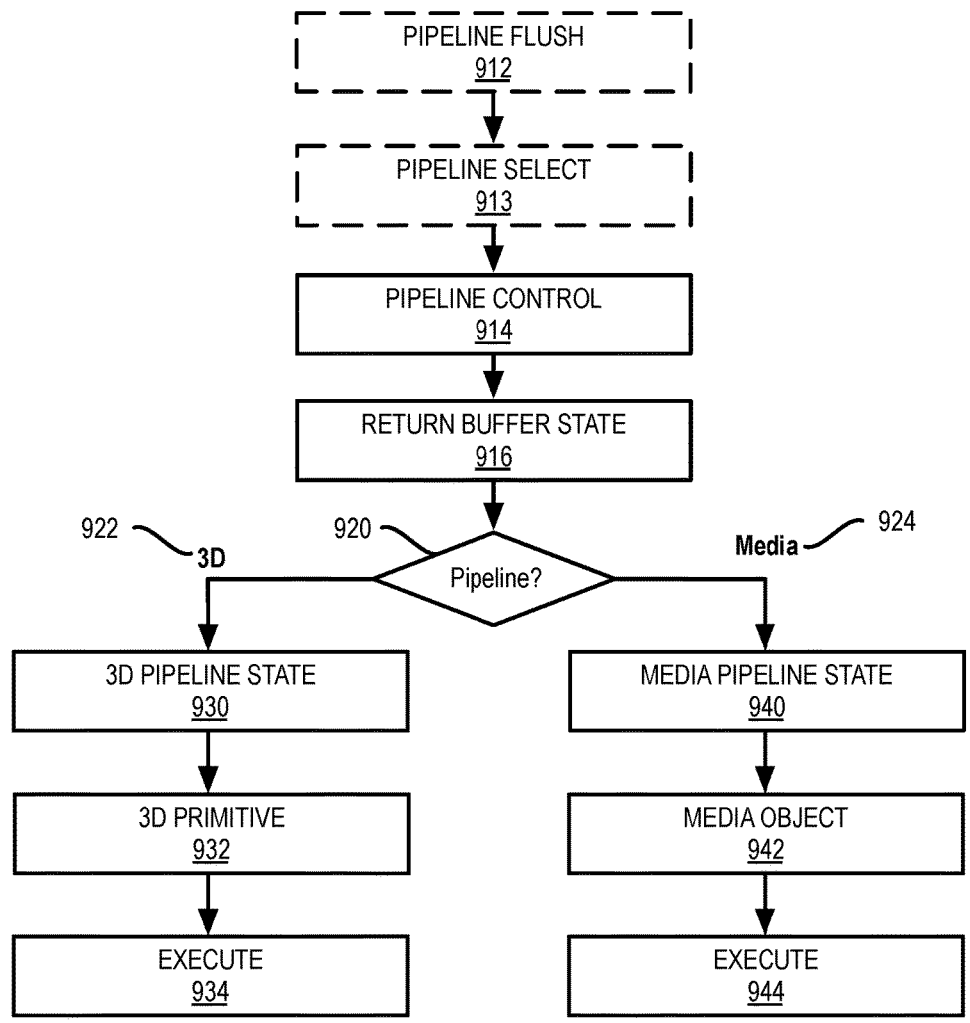

ITU BT.601 Conversion Matrix 1500

$$\begin{pmatrix} R \\ G \\ B \end{pmatrix} = \begin{bmatrix} 1 & 0 & 1.371 \\ 1 & -0.336 & -0.698 \\ 1 & 1.732 & 0 \end{bmatrix} \begin{pmatrix} Y \\ U \\ V \end{pmatrix}$$

Output RGB Pixel Value 1506

Conversion Coefficients 1504A

Input YUV Pixel Value 1502

FIG. 15A

$$\begin{pmatrix} R \\ G \\ B \end{pmatrix} = \begin{bmatrix} 1 & 0 & 2-\left(\frac{1}{2}+\frac{1}{16}+\left(\frac{1}{32}+\frac{1}{256}\right)\right) \\ 1 & -\left(\frac{1}{4}+\frac{1}{16}+\frac{1}{32}\right) & -\left(\frac{1}{2}+\frac{1}{4}-\left(\frac{1}{32}+\frac{1}{256}\right)\right) \\ 1 & 2+\left(-\frac{1}{4}+\frac{1}{64}+\frac{1}{128}\right) & 0 \end{bmatrix} \begin{pmatrix} Y \\ U \\ V \end{pmatrix}$$

Output RGB Pixel Value 1506

Fixed Point Approximations 1504B

Input YUV Pixel Value 1502

COLOR SPACE CONVERSION LOGIC HAVING REDUCED CONVERSION ERROR

TECHNICAL FIELD

Embodiments generally relate to graphics processing logic. More particularly, embodiments relate to graphics processing logic to perform color space conversion.

BACKGROUND

A color space is a mathematical representation of a set of colors. Various color spaces are known in the art and are tailored for specific uses. The Red, Green, and Blue color spaces (RGB or R'G'B', which is gamma corrected RGB), are used in computer graphics. Luma, Chroma based color spaces (e.g., YIQ, YUV and YCrCb) are used in video systems. Cyan, Magenta, Yellow, Key (CMYK) are used in color printing. These color spaces are directly related to the intuitive notions of hue, saturation and brightness. All color spaces can be derived from the RGB information supplied by devices such as cameras and scanners. Different color spaces have historically evolved for different applications. In each case, a color space was chosen for application specific reasons.

The convergence of computers, the Internet and a wide variety of video devices, all using different color representations, may require designers of digital logic the operates upon image data to convert between the various color spaces. For example, it may be desirable to have all inputs converted to a common color space before image processing algorithms and processes are executed. Accordingly, color space conversion logic may be implemented for a number of products designed for use in image and video processing.

BRIEF DESCRIPTION OF THE DRAWINGS

The various advantages of the embodiments will become apparent to one skilled in the art by reading the following specification and appended claims, and by referencing the following drawings, in which:

FIG. 9A is a block diagram illustrating a graphics processor command format according to an embodiment;

FIG. 9B is a block diagram illustrating a graphics processor command sequence according to an embodiment;

FIG. 15A-B show an exemplary ITU BT.601 conversion matrix 1500 to convert from a YUV to an RGB color space;

DESCRIPTION OF EMBODIMENTS

Figure 1:
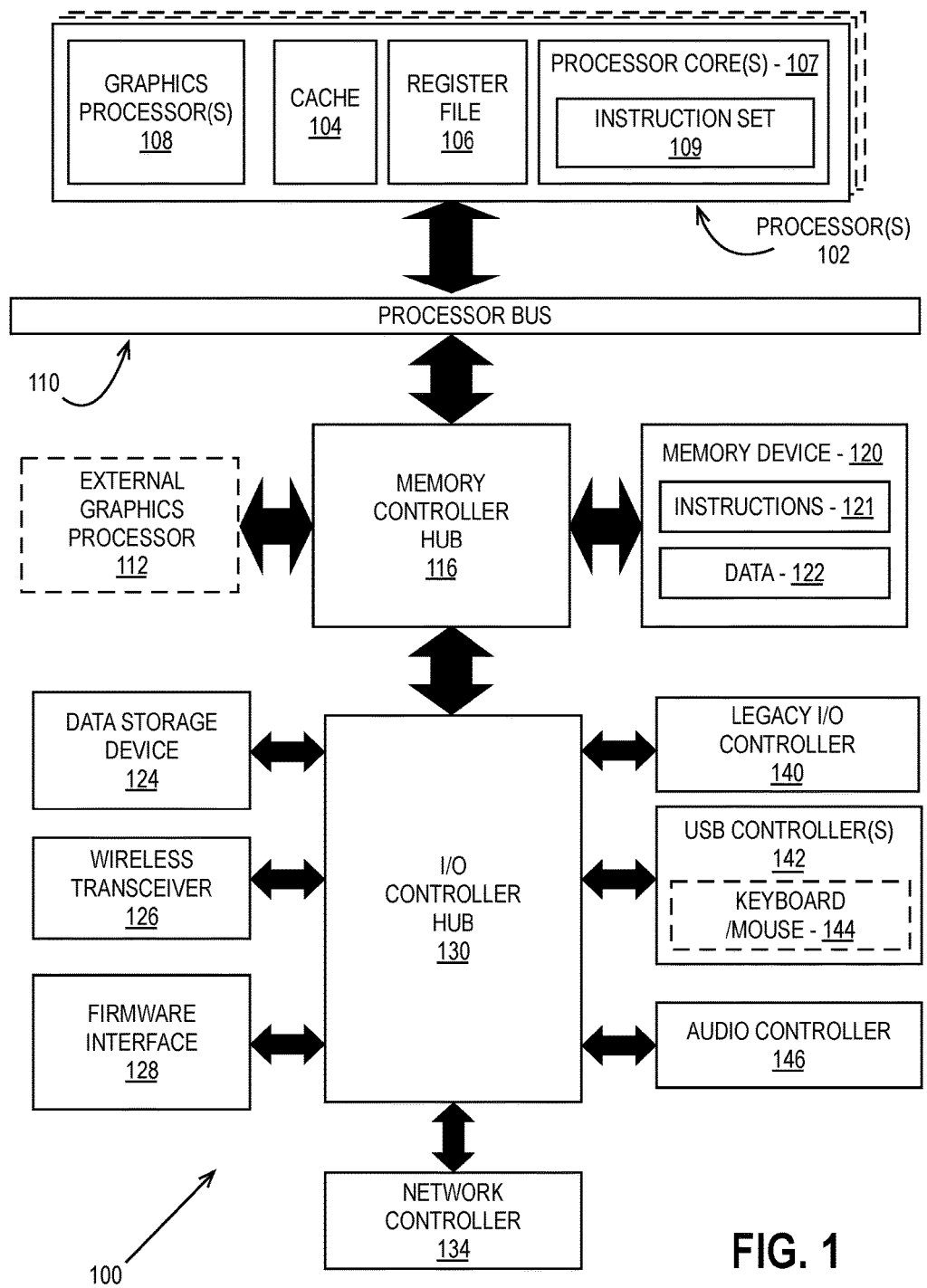
FIG. 1 is a block diagram of an embodiment of a computer system with a processor having one or more processor cores and graphics processors.

The RGB color space is used in computer graphics because color displays combine Red, Green and Blue colors to create a final desired pixel color. For display. Also, a system that is designed using the RGB color space can take advantage of a large number of existing software algorithms. Accordingly, image data in non-RGB formats are converted to an RGB format or color space before display. Conversion between different color spaces can involve the use of hardware logic that is configured to transform pixel color values of an input color space into output values of a target color space. The hardware logic may be configured to apply a transformation matrix to the input color data using a set of conversion coefficients that are defined in the relevant specifications and recommendations governing the technology in which the color spaces are used.

For example, the International Telecommunications Unit (ITU) provides the BT.601 recommendation, which provides encoding parameters for digital television in standard 4:3 and wide-screen 16:9 aspect ratios. The ITU also provides the BT.709 recommendation, which provides encoding parameter values for high definition television (HDTV). The conversion coefficients provided by the ITU are fractional values that may be represented as floating point data types in software based color space conversion logic. While floating point operations may also be performed in hardware (e.g., via a floating point unit (FPU)), hardware based conversion logic is commonly implemented using fixed point logic. The logic circuits of fixed-point hardware are less complicated than those of floating point hardware. Accordingly, an integrated circuit using fixed point logic consumes a smaller die area and has reduced power consumption relative to hardware implemented with floating point logic. Additionally, fixed point calculations may be performed more rapidly than floating point calculations in some instances. Moreover, the hardware using fixed point logic may be manufactured at a reduced cost relative to logic to perform floating point calculations.

However, the dynamic range of fixed point values is reduced relative to floating point values with equivalent word sizes. The loss of dynamic range can cause a loss of precision and can introduce errors in the values computed by the fixed point logic relative to the values defined in the relevant specifications. The difference in computed values and specification values can impact the colors of content displayed post conversion, as variations in the pixel color values can result in a displayed image that differs from the originally captured image.

Embodiments described herein provide a fixed point hardware implementation of color space conversion logic that uses a re-defined computation of color space conversion coefficients so as to reduce color space conversion error relative to specification values by as much as 99%. In one embodiment, the logic can be implemented without increasing the number of hardware gates used by existing implementations.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-12 provide an overview of exemplary data processing system and graphics processor logic that incorporates or relates to the various embodiments. FIGS. 13-20 provide specific details of the various embodiments. Although some of the following embodiments are described with reference to a graphics processor, similar techniques and teachings can be applied to other types of circuits or semiconductor devices, as the teachings are applicable to any processor or machine that manipulates or processes image data.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
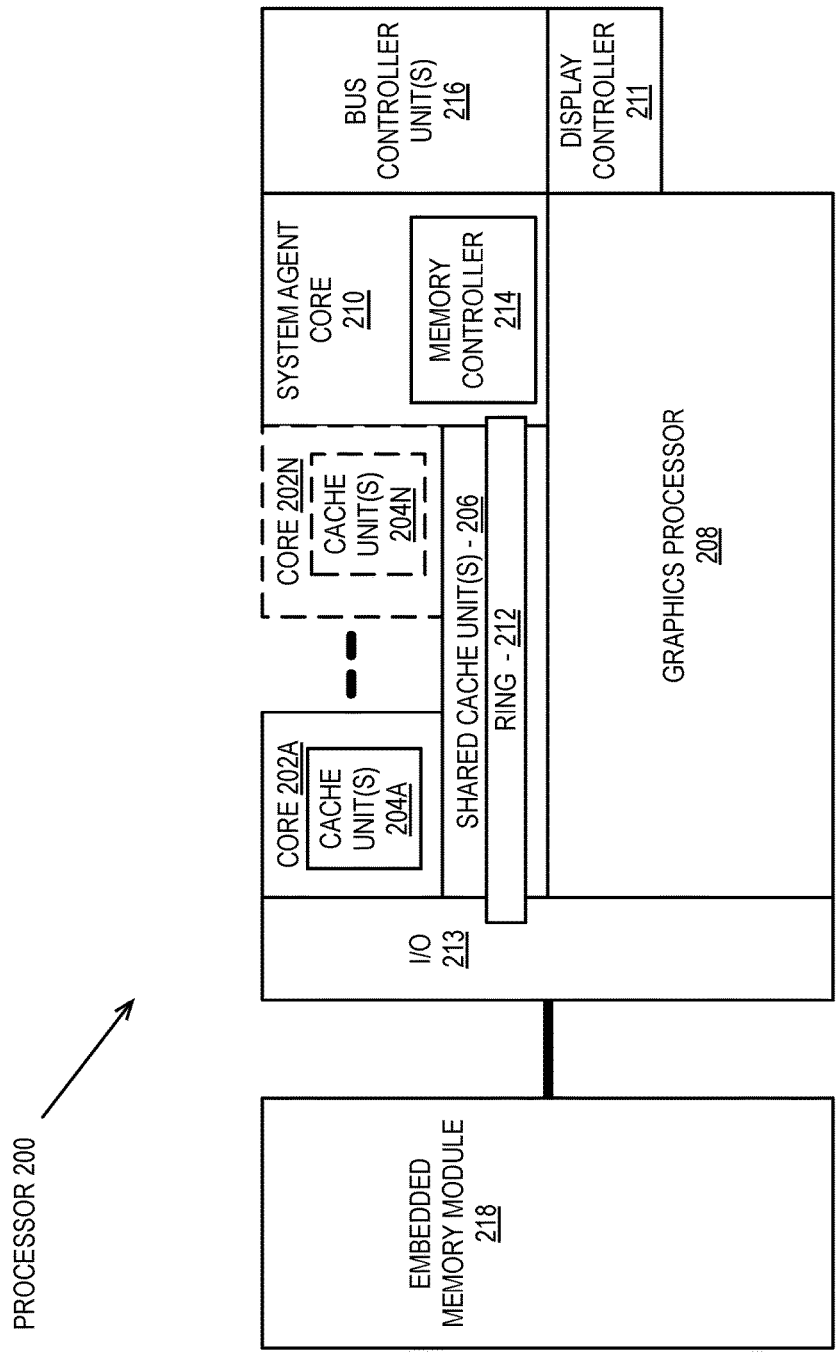
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
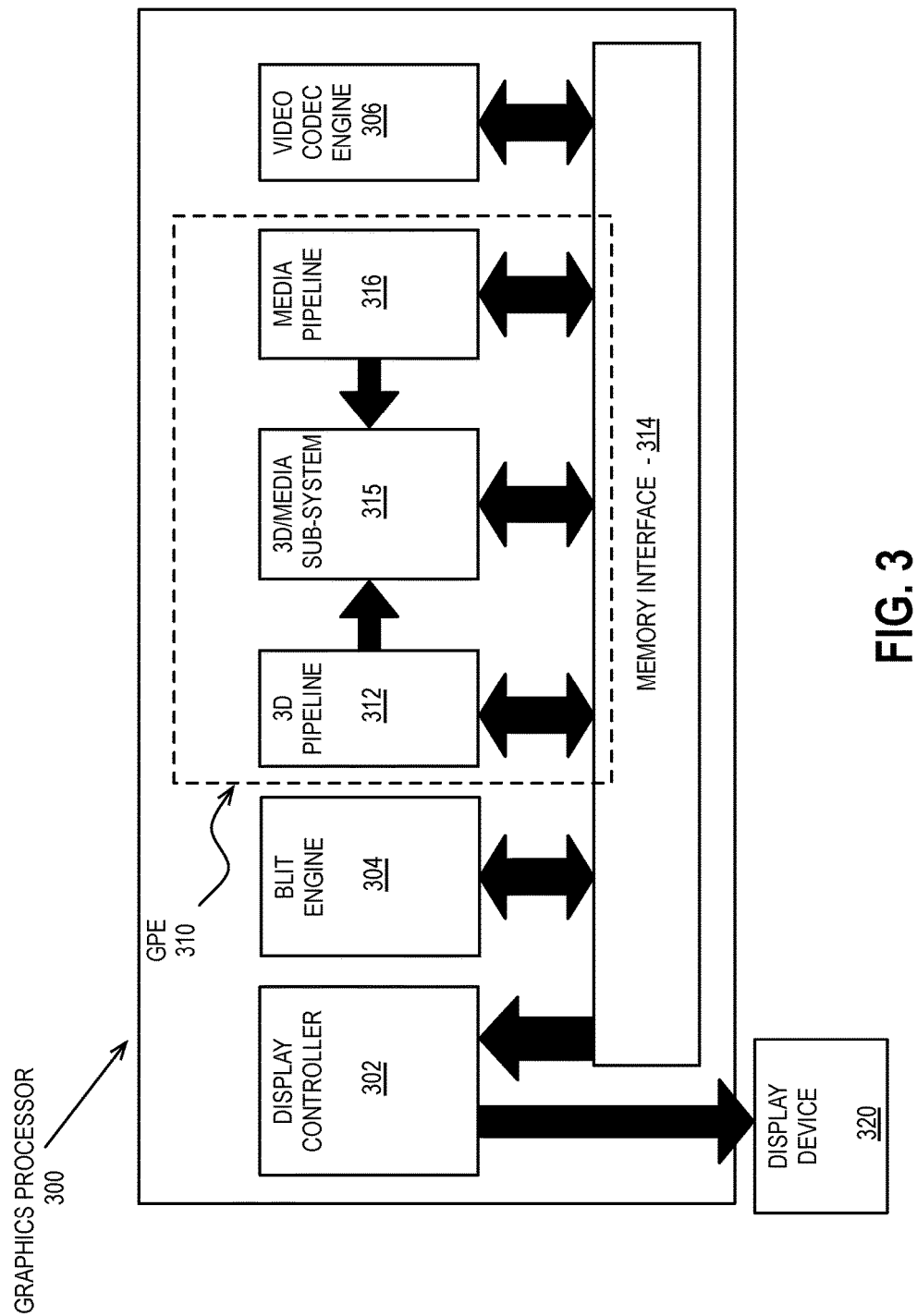
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/

MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
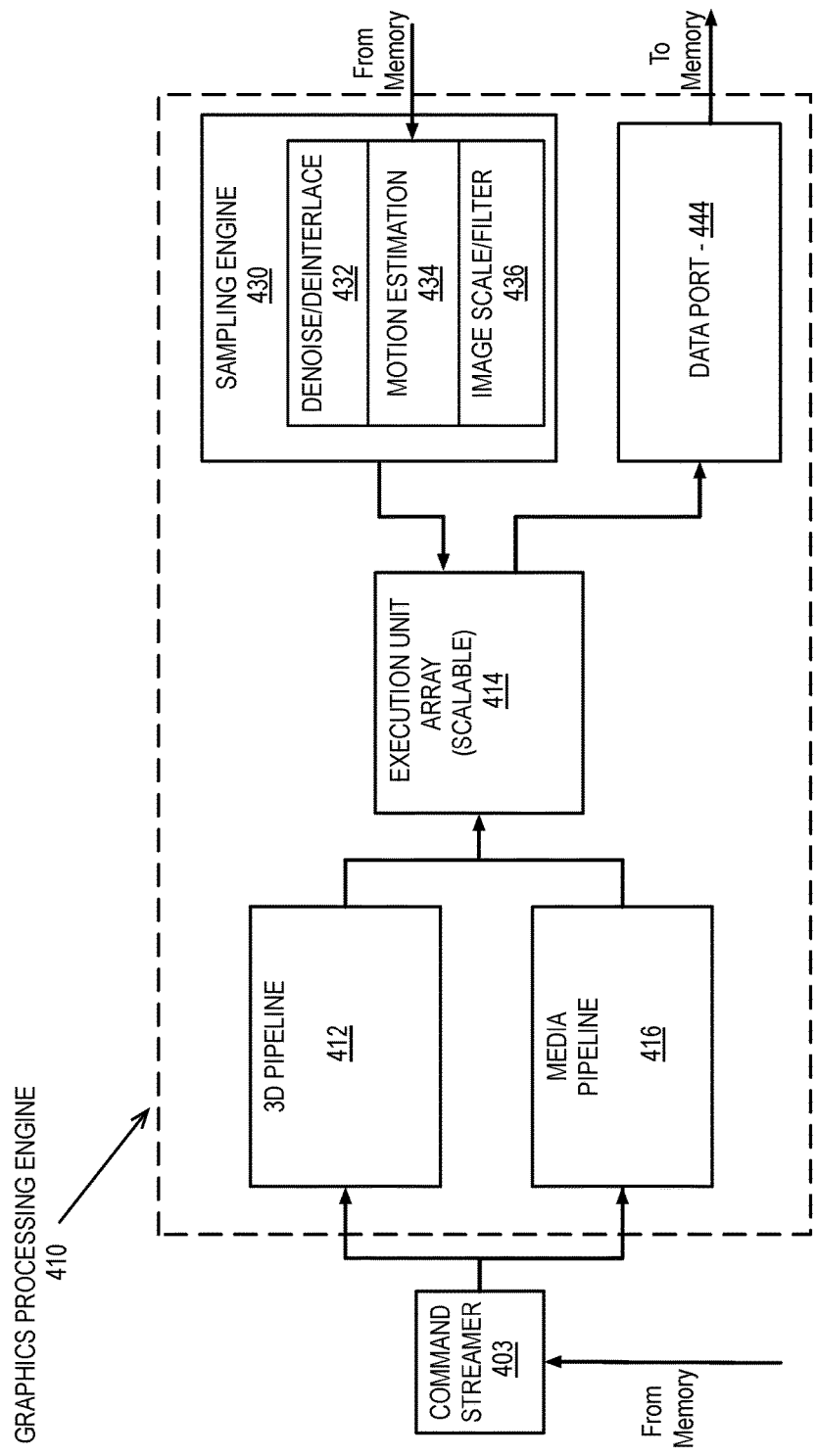
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
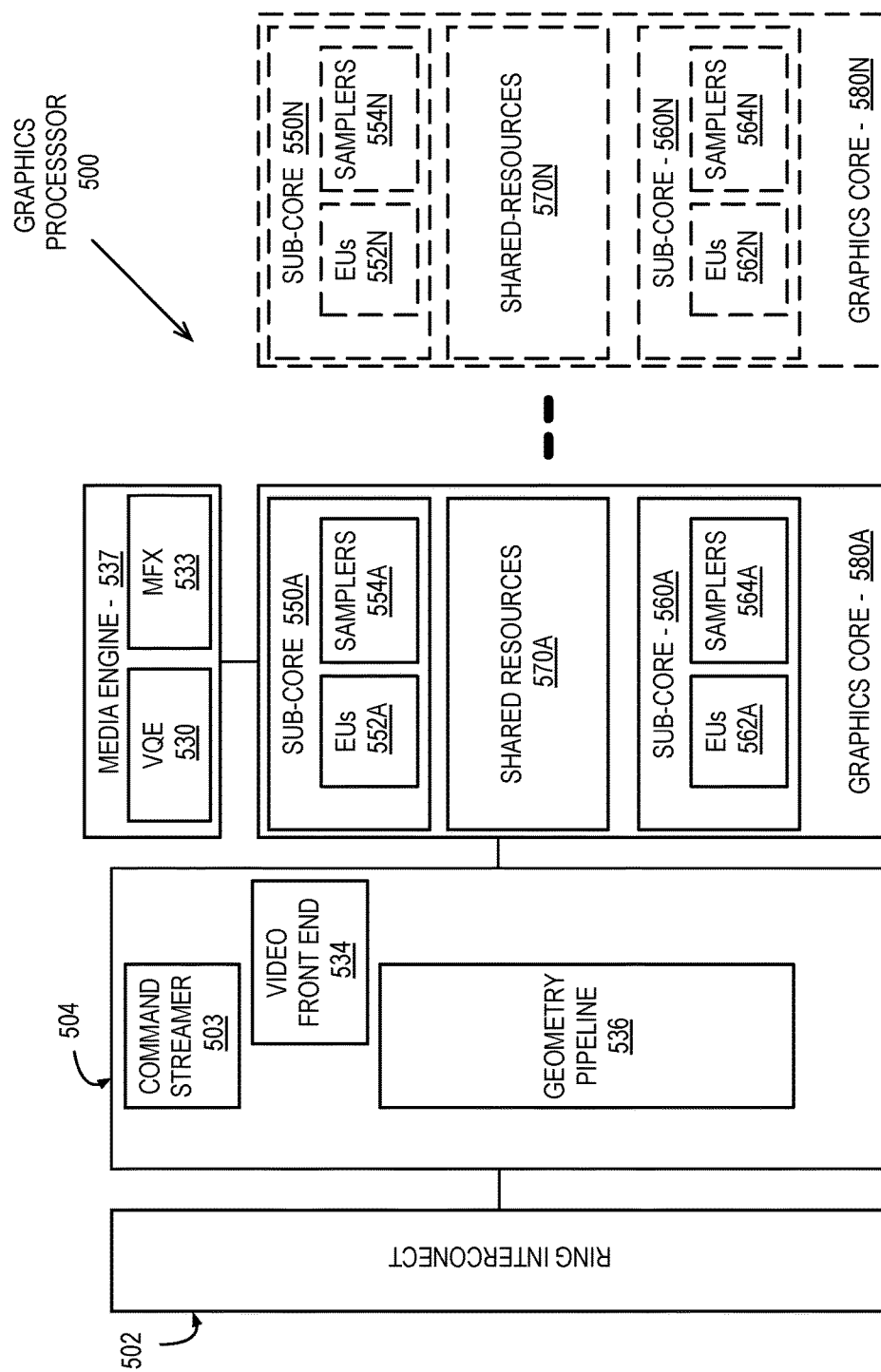
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
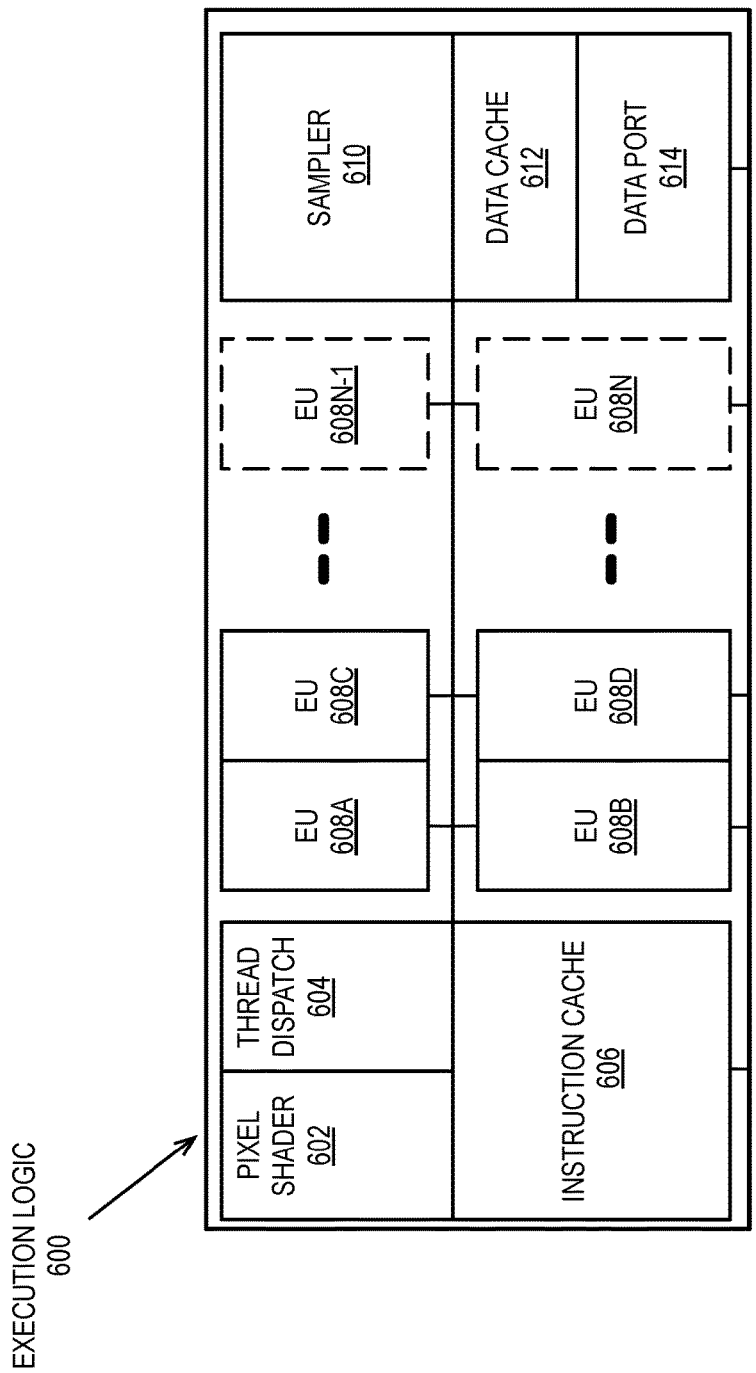
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
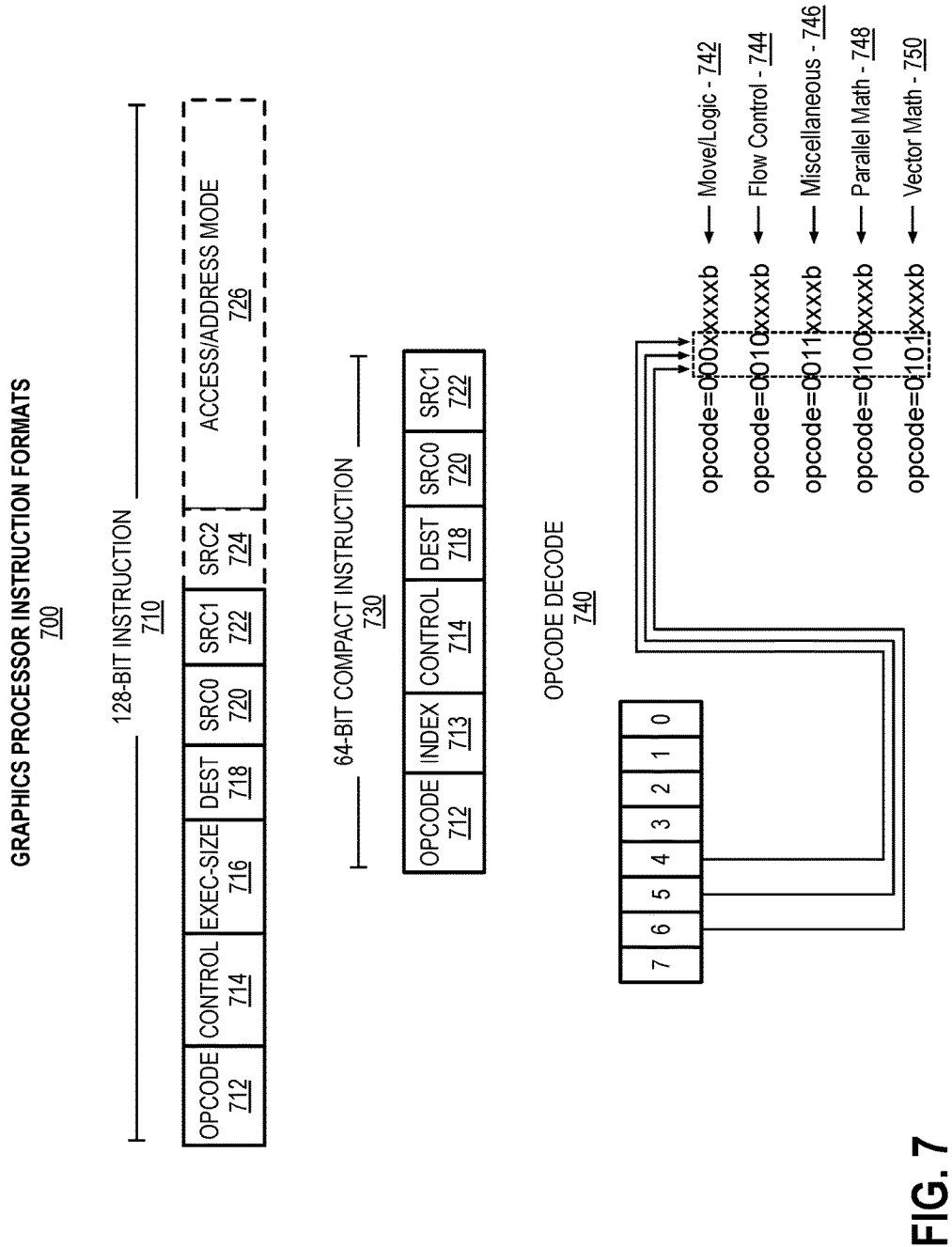
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
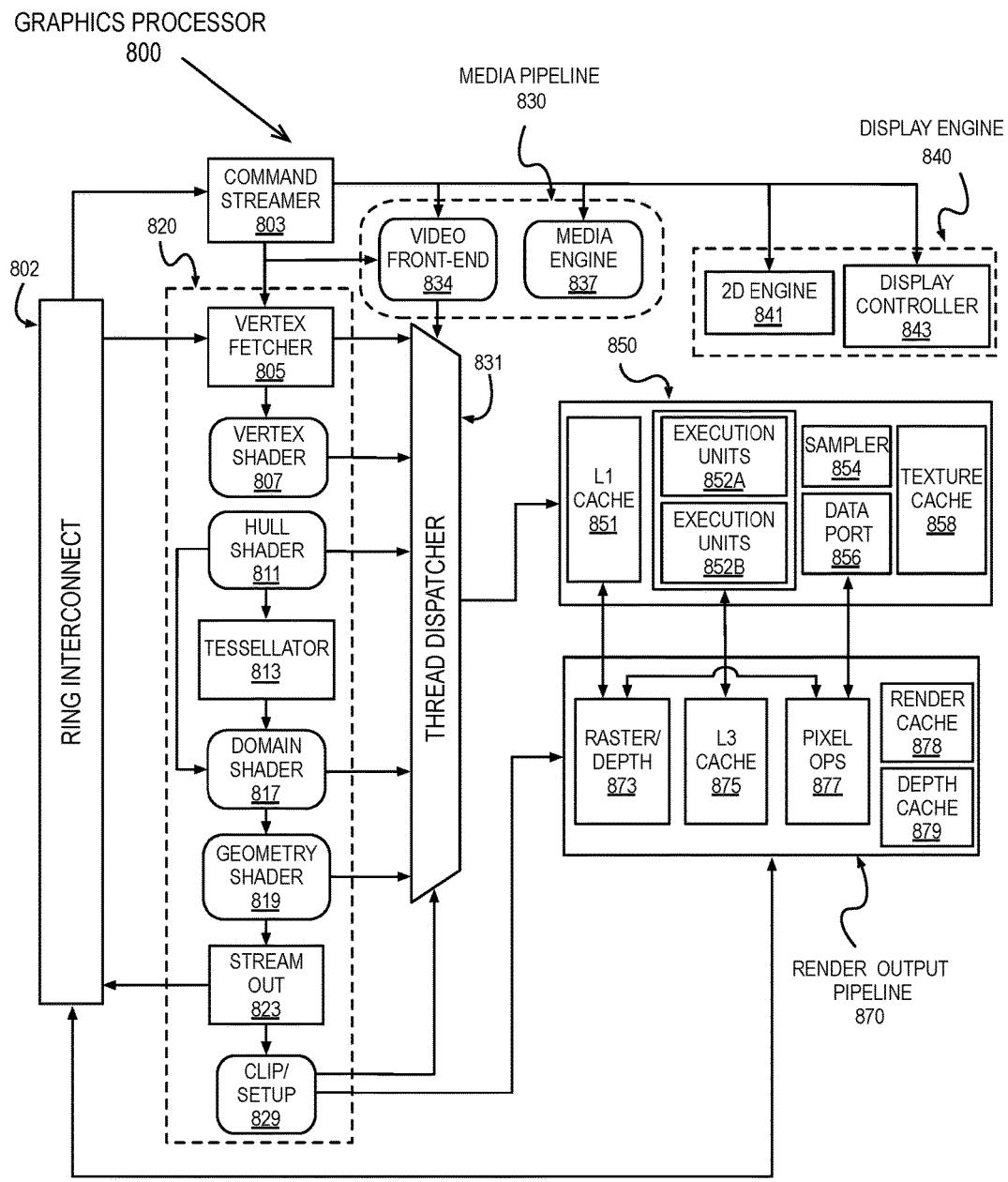
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
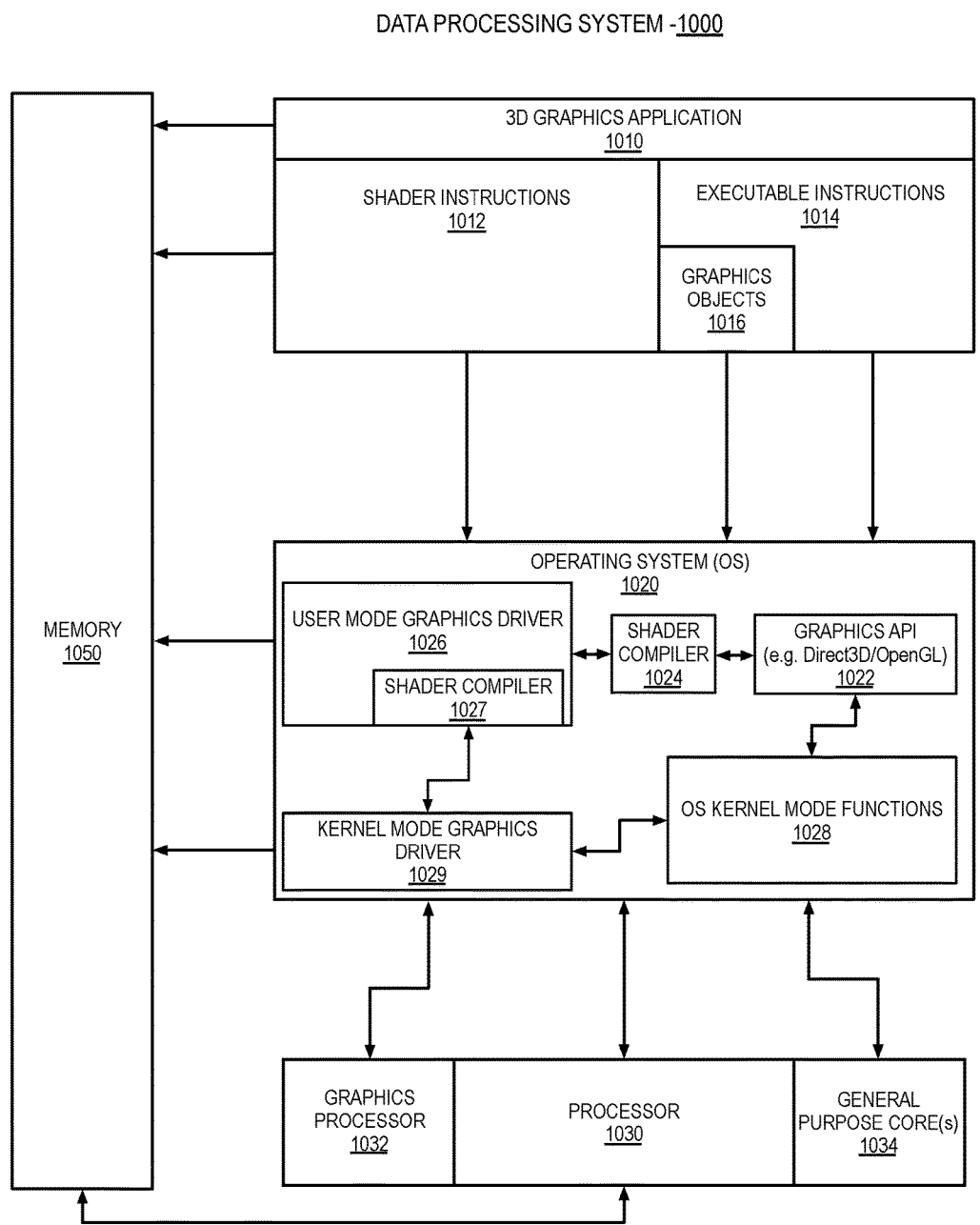
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
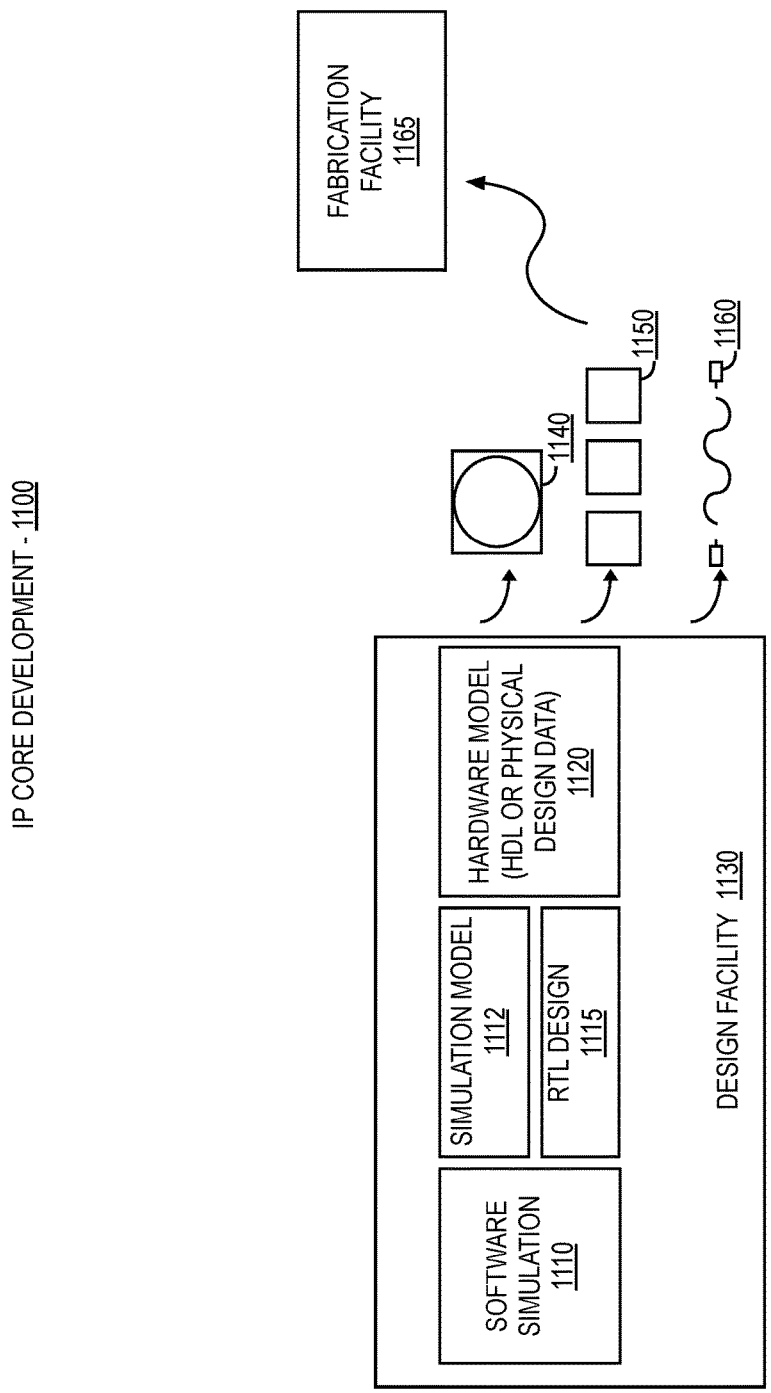
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
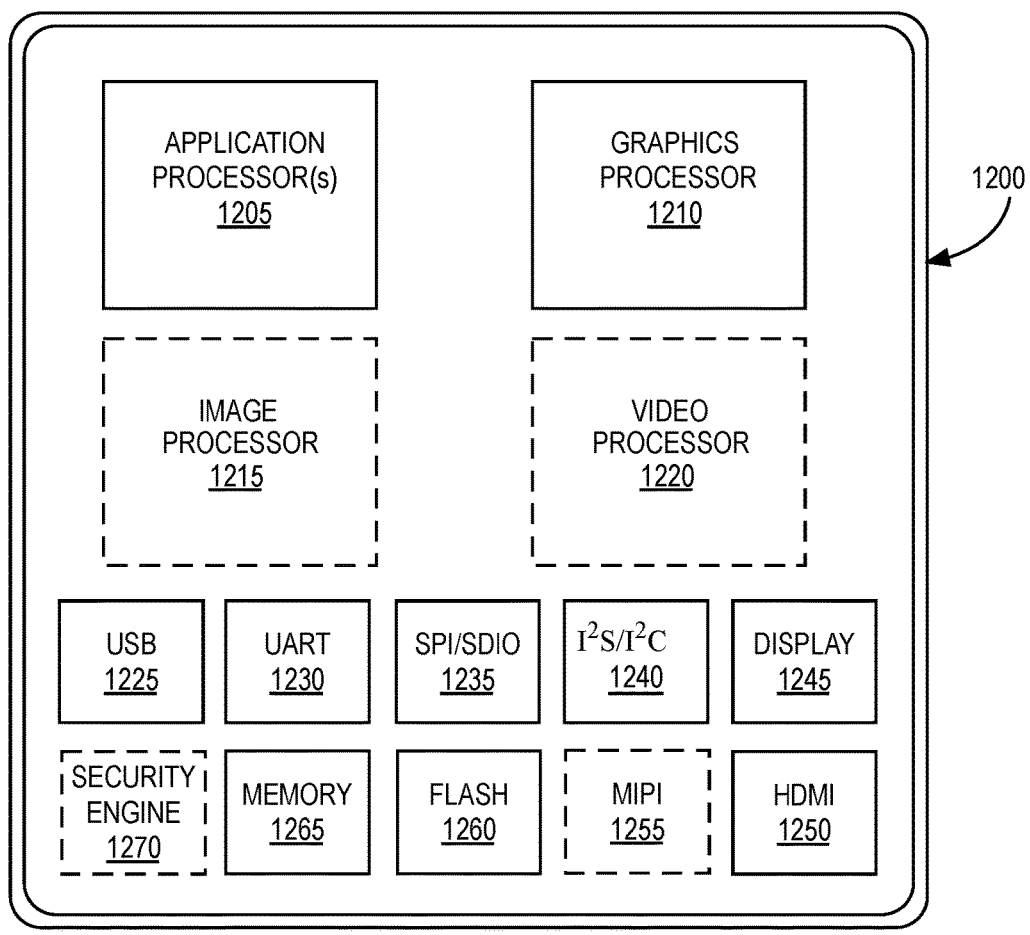
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general-purpose processor cores.

Color Space Conversion Logic Having Reduced Conversion Error

A color space is a subset of a color model. The purpose of a color model is to facilitate the specification of colors in some standard generally accepted way. In essence, a color model is a mathematical specification of a 3-D coordinate system and a subspace within that system where each color is represented by a single point. A color space is the set of colors that can be displayed or reproduced in a medium. The ITU BT.601 and ITU BT.709 are specifications defining color spaces and the conversion of color spaces from a color space in the YUV color model to a color space in the RGB color model. The specifications define a set of coefficient tables and equations to approximately compute the fractional coefficients in digital hardware. Existing hardware implementations may implement the same set of equations as defined in the specifications.

Embodiments provided herein implement a redefined set of equations to compute coefficients for both ITU BT.601 and ITU BT.709 such that the equations, once implemented in hardware consume approximately the same amount of logic gates as the existing implementation, but significantly reduces errors relative to the specification values. This reduced error and improved adherence to the specification's defined values can translate to enhanced image quality and a better visual experience.

Figure 13:
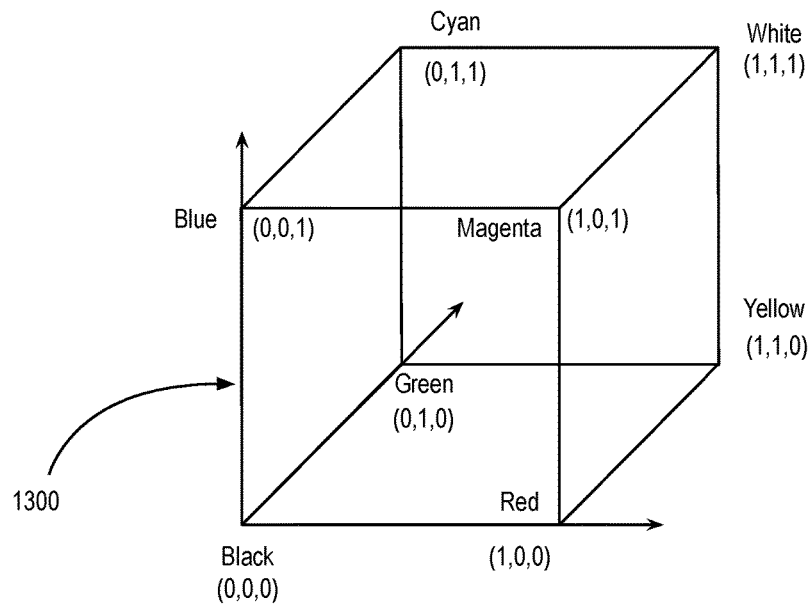
FIG. 13 illustrates a color space based on the RGB color model.

FIG. 13 illustrates a color space 1300 based on the RGB color model. The color space 1300 may be the sRGB color space, or another RGB color space. The color space 1300 defines a set of normalized coordinates that represent a color as an additive combination of red (1,0,0), green (0,1,0), and blue (0,0,1) primary color values. The primary colors can be added to produce the secondary colors of magenta (1,0,1), cyan (0,1,1), and yellow (1,0,1). The combination of red, green, and blue at full intensities makes white (1,1,1). Zero intensity of all primary colors results in black (0,0,0). In general, color computer displays create color by combining red, green, and blue sub-pixel elements to create a specific color at each pixel.

Figure 14:
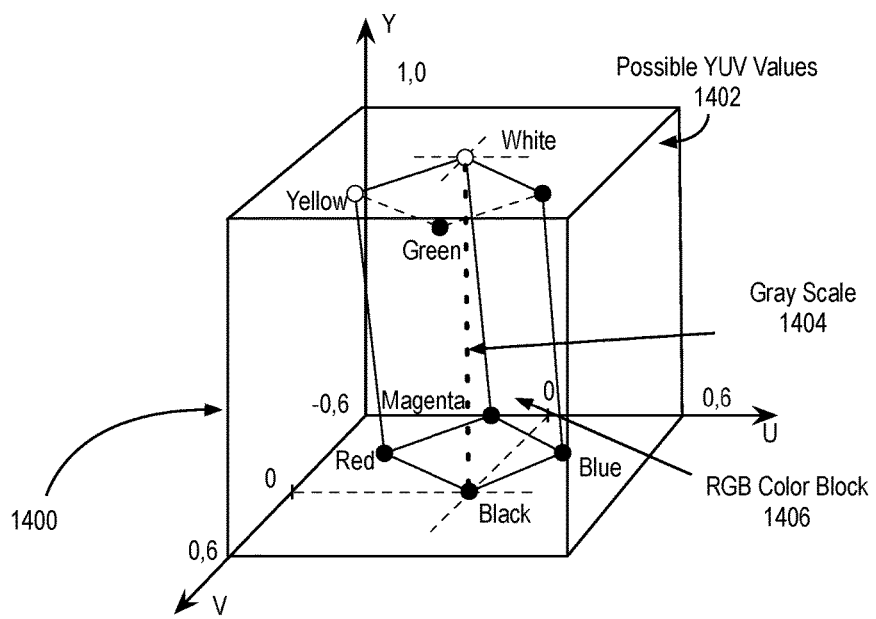
FIG. 14 illustrates a color space 1400 based on the YUV color model.

FIG. 14 illustrates a color space 1400 based on the YUV color model. The YUV color model is used for color spaces used for a color imaging and image processing. The YUV color model can be used to encode a color image or video with reduced bandwidth for chrominance components, enabling transmission errors or compression artifacts to be more efficiently masked by human perception than using an RGB color representation. The YUV model is useful for image processing in that the YUV model enables the decoupling of luminance and color information, which enables the luminance component of an image to be processed without changing the color component of the image.

The illustrated color space 1400 includes a luminance (Y) component and two color difference (U, V) components that define a chrominance value. A weighted addition of the red, green, and blue color components is used to create the luminance component. Subtracting luminance from blue and from red forms the chrominance components. The precise coefficients to the conversion equations used during the RGB to YUV conversion can vary based on the specifics of the color space 1400, including the applicable standards or recommendations for the desired use or format of the image data, such as ITU BT.601 for standard definition television and ITU BT.709 for high definition television. Additionally, gamma compensation can be performed on the RGB and/or YUV components before or during transformation, which can also change the specific equation coefficients used for the transformation.

The set of possible YUV values 1402 in the color space includes many combinations of YUV values that result in invalid values in the RGB color block 1406 (e.g., the color space 1300 of FIG. 13). Thus, the set of valid RGB values is a strict subset of the set of possible YUV values 1402. Additionally, color images can be displayed as images on a gray scale 1404 by displaying only luminance (e.g., Y axis) data.

FIG. 15A-B show an exemplary ITU BT.601 conversion matrix 1500 to convert from a YUV to an RGB color space. FIG. 15A shows a matrix operation to convert an input YUV pixel value 1502 to an output RGB pixel value 1506 using a set of floating point conversion coefficients 1504A. FIG. 15B shows fractional fixed point approximations 1504B of the conversion coefficients suitable for use in a fixed point hardware implementation of the BT.601 conversion.

The floating point conversion coefficients 1504A shown in FIG. 15A can be used to convert to 8-bit digital gamma corrected RGB data with a 16-235 nominal range from YUV data encoded in a manner consistent with the BT.601 recommendation. The floating point conversion coefficients 1504A are also shown in Equation 1 below.

$$YUV \text{ to } RGB \text{ Conversion Matrix} \qquad \text{Equation 1}$$

$$\begin{pmatrix} R \\ G \\ B \end{pmatrix} = \begin{bmatrix} 1 & 0 & 1.371 \\ 1 & -0.336 & -0.698 \\ 1 & 1.732 & 0 \end{bmatrix} \begin{pmatrix} Y \\ U \\ V \end{pmatrix}$$

The coefficients and specified floating point values are also shown in Table 1 below.

TABLE 1

ITU BT.601 floating point conversion coefficients for gamma corrected RGB.

| Coefficient | Spec Value |
| --- | --- |
| C1 | 1.371 |
| C2 | 0.336 |
| C3 | 0.698 |
| C4 | 1.732 |

The specific coefficient values can vary based on saturation adjustments and based on the nominal range of the data. The resulting equations from the matrix operation of Equation 1 and FIG. 15A can be generally represented as shown in Table 2 below, where the specific coefficient values (e.g., C1-C4) can vary based on the usage model for the individual data.

TABLE 2

Generalized Individual RGB conversion equations.
Individual RGB Equations

| | |
| --- | --- |
| R | Y + C1 × V |
| G | Y − C2 × U − C3 × V |
| B | Y + C4 × U |

While the floating point coefficients of Table 1, Equation 1, and FIG. 15A can be used by hardware configured to perform floating point operations, for logic that contains only integer or fractional arithmetic logic units (ALU), implementation of the ITU BT.601 conversion matrix 1500 is performed using fixed point approximations of the floating point data. The logic circuits of fixed-point hardware are generally less complicated than those of floating point hardware. Accordingly, an integrated circuit using fixed point logic may consume a smaller die area and have reduced power consumption relative to hardware implemented using floating point logic. However, to perform hardware conversion of YUV to RGB data using fixed point logic, fixed point approximations of the floating point coefficients are used.

FIG. 15B shows a matrix operation using fractional fixed point approximations 1504B that may be represented in a fixed point fractional format having at least an 8-bit fractional component. Using an 8-bit register, the fractional component of a decimal number may be expressed using integer numbers between 0 and $2^8$ minus 1 (or 255) by converting the decimal number to its binary equivalent. Fixed point conversion coefficients 1504B that are consistent with the BT.601 recommendations are shown in Equation 2 below.

$$YUV \text{ to } RGB \text{ } BT.601 \text{ Fixed Point Conversion Matrix} \qquad \text{Equation 2}$$

$$\begin{pmatrix} R \\ G \\ B \end{pmatrix} =$$

$$\begin{bmatrix} 1 & 0 & 2 - \left(\frac{1}{2} + \frac{1}{16} + \left(\frac{1}{32} + \frac{1}{256}\right)\right) \\ 1 & -\left(\frac{1}{4} + \frac{1}{16} + \frac{1}{32}\right) & -\left(\frac{1}{2} + \frac{1}{4} - \left(\frac{1}{32} + \frac{1}{256}\right)\right) \\ 1 & 2 + \left(-\frac{1}{4} + \frac{1}{64} + \frac{1}{128}\right) & 0 \end{bmatrix}$$

$$\begin{pmatrix} Y \\ U \\ V \end{pmatrix}$$

The fixed point approximations of floating point conversion coefficients can be constructed using a fractional representation of the floating point data. This fractional representation can be composed from a combination of multiple fractions, where each fraction represents a bit in the fixed point approximation. However, the reduced degree of precision for fixed point representation may result in some degree of quantization of the data, as only a finite number of values may be represented. A challenge in developing fixed point logic to perform color space conversion is selecting an approximation that can be implemented in hardware using a minimum amount of logic gates.

For example, Equation 2 and the fixed point approximations 1504. shows a fractional fixed point approximation of coefficient C1 (1.371) can be calculated by the Equation 3 below.

$$\text{Exemplary Fixed point calculation of coefficient } C1 \qquad \text{Equation 3}$$

$$C1_{FP} = 2 - \left(\frac{1}{2} + \frac{1}{16} + \left(\frac{1}{32} + \frac{1}{256}\right)\right)$$

The resulting fixed point approximation of C1 (e.g., $C1_{FP}$) in decimal format (limited to three decimal places) is 1.402, which differs from the specified floating point coefficient. A complete list of fixed point approximations 1504B used in an existing hardware implementation for BT.601 YUV conversion is shown in Table 3 below.

TABLE 3

ITU BT.601 fixed point coefficients for gamma corrected RGB.

| Coefficient | Spec Approximation |
| --- | --- |
| C1 | 1.402 |
| C2 | 0.344 |
| C3 | 0.715 |
| C4 | 1.773 |

The values shown in Table 3 are generally consistent with BT.601, although the precisely calculated value for the fixed point approximation can vary across implementations based on whether fixed point conversion is performed using rounding or truncation and the precision of the logic used to implement the calculations. Each fixed point coefficient varies slightly form the floating point coefficients due to a loss of precision. This variance can result in color conversion areas for larger RGB values. An exemplary set of fixed point approximations and associated errors relative to each floating point coefficient is shown in Table 4 below.

TABLE 4

Spec wise BT.601 Fixed Point Approximation

| Floating Point Coefficient | Fixed Point Coefficient for Spec Wise H/W Implementation | Spec wise error (Coefficient − HW Implementation) | Spec wise Error (%) (Baselined to Coefficient) |
|---|---|---|---|
| C1 = 1.371 | 2 − (½ + ¹⁄₁₆ + ¹⁄₃₂ + ¹⁄₂₅₆) | 0.03134375 | 2.28% |
| C2 = 0.336 | (¼ + ¹⁄₁₆ + ¹⁄₃₂) | 0.0077500 | 2.30% |
| C3 = 0.698 | (½ + ¼ − (¹⁄₃₂ + ¹⁄₂₅₆) | 0.1684375 | 2.40% |
| C4 = 1.732 | 2 + (−¼ + ¹⁄₆₄ + ¹⁄₁₂₈) | 0.04143750 | 2.39% |

As shown in Table 4, the approximation error of the specification fixed point approximation value ranges from 2.28% to 2.40% across the set of coefficients. On higher values of RGB these errors lead to changes in the pixel values, giving rise to an inaccurate image. For a better image viewing experience it would be beneficial to reduce the amount of conversion error introduced by existing fixed point implementations of YUV to RGB conversion logic. However, maintaining a low hardware gate count and minimizing silicon area consumed by digital logic is a common design challenge facing digital designers. Accordingly, It may not benefit a design to increase precision and/or reduce error at the expense of significantly increased gate count and active power consumption of the resulting logic.

Embodiments described herein provide a fixed point hardware implementation of color space conversion logic that uses a re-defined computation of color space conversion coefficients to reduce color space conversion error relative to specification values by as much as 99%. In one embodiment, the logic can be implemented without increasing the number of hardware gates used by existing implementations. A fractional representation of the coefficient calculation used in one embodiment to implement a YUV to RGB conversion circuit is shown in Table 5 below.

TABLE 5

Reduced Error BT.601 Fixed Point Approximation

| Floating Point Coefficient | Fixed Point Coefficient for Reduced Error H/W Implementation | Improved error (Coefficient − HW Implementation) | Improved Error (%) (Baselined to Coefficient) |
|---|---|---|---|
| C1 = 1.371 | 1 + (¼ + ⅛ − ¹⁄₂₅₆) | 0.00009375 | ~0% |
| C2 = 0.336 | (¼ + ¹⁄₁₆ + ¹⁄₆₄ + ¹⁄₁₂₈) | 0.00006250 | ~0% |
| C3 = 0.698 | (½ + ⅛ + ¹⁄₁₆ + ¹⁄₁₂₈ + ¹⁄₂₅₆) | 0.00121875 | 0.17% |
| C4 = 1.732 | 1 + (½ + ⅛ + ¹⁄₁₆ + ¹⁄₃₂ + ¹⁄₁₂₈ + ¹⁄₂₅₆) | 0.00153125 | 0.08% |

The reduced error coefficient calculation shown in Table 5 results in significantly reduced error for each fixed point coefficient used in converting BT.601 YUV data to RGB. Additionally, the coefficient calculation can be implemented in hardware without a significant increase in the number of logic gates required to implement the logic. Floating point coefficient values represented by the fractional fixed point representation in Table 5 are shown in comparison with the spec (e.g., ITU recommended) approximations in Table 6 below.

TABLE 6

Reduced Error Fixed Point Coefficient Approximations for ITU BT.601

| Coefficient | Spec Approximation | Floating Point Value | Reduced Error Approximation |
|---|---|---|---|
| C1 | 1.402 | 1.371 | 1.371 |
| C2 | 0.344 | 0.336 | 0.336 |
| C3 | 0.715 | 0.698 | 0.699 |
| C4 | 1.773 | 1.732 | 1.730 |

While aspects of a hardware implementation to of logic to perform YUV to RGB conversion based on the ITU BT.601 recommendation, embodiments described herein are not limited to BT.601. In one embodiment, color space conversion logic is configured to convert YUV data that is encoded in a manner consistent with the ITU BT.709 recommendation for high definition television. Table 7 shows a fractional representation of fixed point coefficients used in a spec wise BT.709 hardware implementation relative to recommended floating point coefficients.

TABLE 7

Spec Wise BT.709 Fixed Point Approximation

| Floating Point Coefficient | Fixed Point Coefficient for Spec Wise H/W Implementation | Spec Wise Error (Coefficient − HW Implementation) | Spec Wise Error (%) (Baselined to Coefficient) |
|---|---|---|---|
| C1 = 1.539647 | 1 + (½ + ¹⁄₁₆ + ¹⁄₁₂₈ + ¹⁄₂₅₆) | 0.0345711 | 2.245% |
| C2 = 0.183143 | (⅛ + ¹⁄₁₆) | 0.0043570 | 2.379% |
| C3 = 0.457674 | (½ − ¹⁄₃₂) | 0.0110760 | 2.420% |
| C4 = 1.814179 | 2 − (⅛ + ¹⁄₆₄ + ¹⁄₂₅₆) | 0.0412880 | 2.275% |

The fractional representation of the fixed point coefficients shown in Table 7 are implemented in existing hardware that performs conversion between BT.709 YUV data to RGB data. The fractional representation of the fixed point coefficients results in the fixed point approximation for the coefficients shown in Table 8 below.

TABLE 8

ITU BT.709 fixed point coefficients for gamma corrected RGB.

| Coefficient | Spec Approximation |
|---|---|
| C1 | 1.5742188 |
| C2 | 0.1875 |
| C3 | 0.46875 |
| C4 | 1.85546 |

Conversion via hardware logic configured to use the BT.709 fixed point approximations of Table 8 results in a per-coefficient error of between 2.245% and 2.420%. This can result in a visible color difference between the RGB output and the originally encoded YUV data, particularly for high values of RGB.

One embodiment provided for a reduced error BT.709 fixed point approximation for use in fixed point hardware logic configured to perform BT.709 YUV to RGB conversion. The reduced error BT.709 fixed point approximations are shown in Table 9 below.

TABLE 9

Reduced Error BT.709 Fixed Point Approximation

| Floating Point Coefficient | Fixed Point Coefficient for Reduced Error H/W Implementation | Improved error (Coefficient − HW Implementation) | Improved Error (%) (Baselined to Coefficient) |
|---|---|---|---|
| C1 = 1.539647 | 1 + (½ + ¹⁄₃₂ + ¹⁄₁₂₈) | 0.0005845 | ~0% |
| C2 = 0.183143 | (⅛ + ¹⁄₁₆ − ¹⁄₂₅₆) | 0.0004508 | ~0% |
| C3 = 0.457674 | ½ − (¹⁄₃₂ + ¹⁄₁₂₈ + ¹⁄₂₅₆) | 0.0006428 | ~0% |
| C4 = 1.814179 | 2 − (⅛ + ¹⁄₁₆) | 0.0016790 | ~0% |

The fixed point approximation of the BT.709 floating point conversion coefficients are substantially similar to the recommended floating point coefficients and have a Baselined error of approximately 0%. The reduced error approximations are shown in comparison with the spec approximations in Table 10 below.

TABLE 10

Reduced Error Fixed Point Coefficient Approximations for ITU BT.709

| Coefficient | Spec Approximation | Floating Point Value | Reduced Error Approximation |
|---|---|---|---|
| C1 | 1.5742188 | 1.539647 | 1.539063 |
| C2 | 0.1875 | 0.183143 | 0.183594 |
| C3 | 0.46875 | 0.457674 | 0.456031 |
| C4 | 1.85546 | 1.814179 | 1.8125 |

A comparison of output images converted using the spec and reduced error approximations shows that the image converted using the reduced error approximations have RGB values that are closer to the RGB values that would result from a floating point conversion. Additionally, the improved accuracy does not result in a significantly increased silicon die area, as a hardware implementation can be generated that uses a similar amount of logic gates as the logic that uses the recommended approximations. For example, one embodiment provides logic to perform YUV to RGB color space conversion for BT.601 YUV data that can be implemented using ALU logic having 15 adder circuits and 1 subtractor circuit. One embodiment provides logic to perform YUV to RGB color space conversion for BT.709 YUV data that can be implemented using ALU logic having 7 adder circuits and 3 subtractor circuits. However, the specific circuit implementation can vary according to embodiments. In general color conversion logic can be implemented using reduced error approximations using a total of between 16 and 26 circuits (e.g., adder and subtractor circuits) for BT.601 and between 10 and 20 total circuits for BT.709.

Tables 11 and 12 below show a comparison between a count of logic circuits used in an existing implementation in comparison with the number of circuits used in the reduced error implementation described herein. Exemplary logic circuits including adders and subtractors are listed. However, other logic circuits may be used for the coefficient computation logic.

TABLE 11

Circuit comparison between implementations for ITU BT.601 YUV to RGB ITU BT.601

| | Spec wise | | Reduced Error | |
|---|---|---|---|---|
| Coeff | Adders | Subs | Adders | Subs |
| C1 | 3 | 1 | 2 | 1 |
| C2 | 2 | 0 | 3 | 0 |
| C3 | 2 | 1 | 4 | 0 |
| C4 | 2 | 1 | 6 | 0 |

TABLE 12

Circuit comparison between implementations for ITU BT.709 YUV to RGB ITU BT.709

| | Spec wise | | Reduced Error | |
|---|---|---|---|---|
| Coeff | Adders | Subs | Adders | Subs |
| C1 | 4 | 0 | 3 | 0 |
| C2 | 1 | 0 | 1 | 1 |
| C3 | 0 | 1 | 2 | 0 |
| C4 | 2 | 1 | 1 | 1 |

Figure 16:
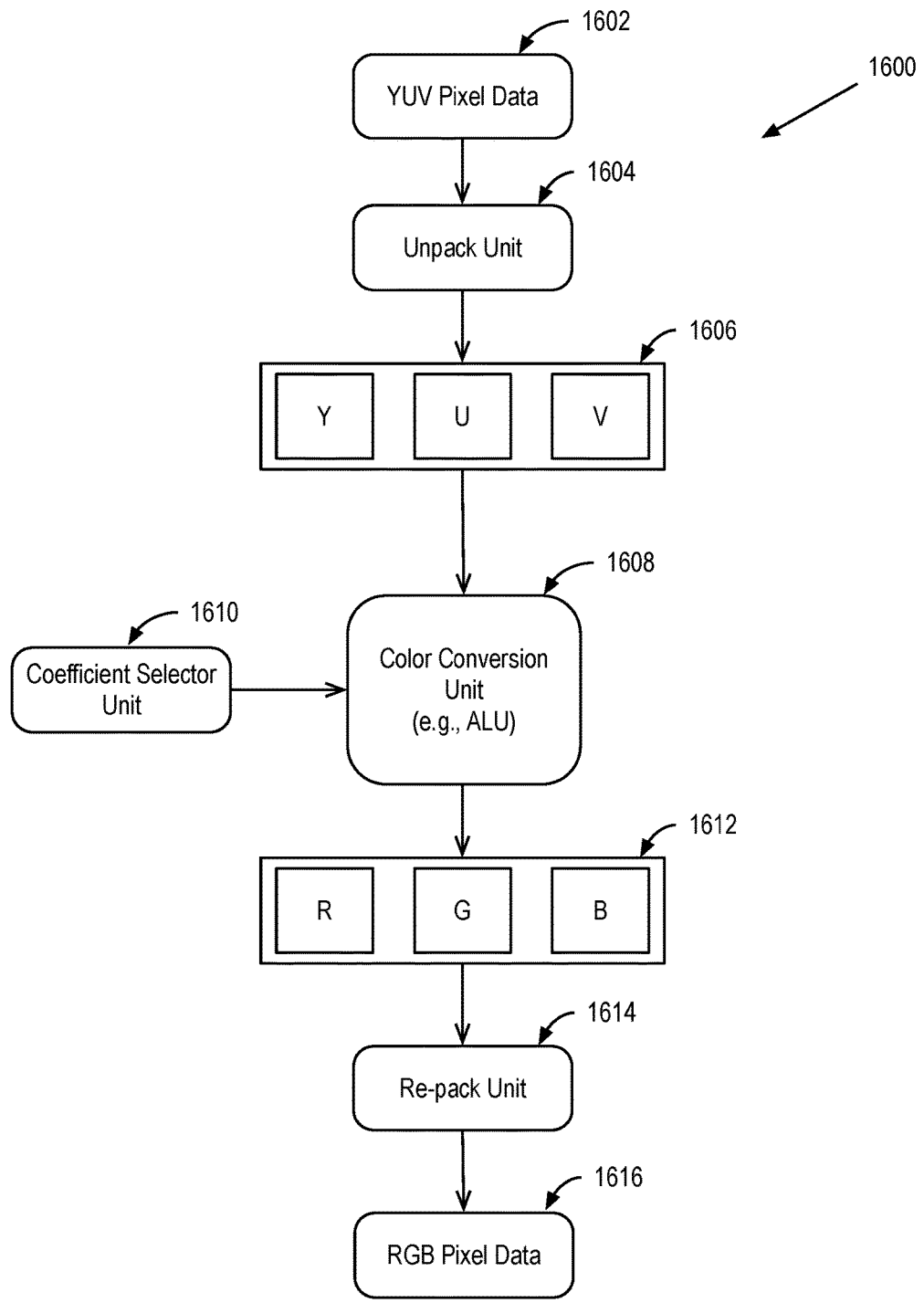
FIG. 16 is a block diagram illustrating conversion logic to convert YUV pixel data to RGB pixel data, according to an embodiment.

For the exemplary implementations shown in Table 11 and Table 12 above, the number of adder and subtractor circuits can be determined based on the number of circuits used to implement the respective coefficient calculations in the ALU logic used for color space conversion. The total number of adder and subtractor circuits used in the reduced error implementations for both BT.601 and BT.709 is slightly higher than an existing implementation, the accuracy of the conversion is significantly improved FIG. 16 is a block diagram illustrating conversion logic 1600 to convert YUV pixel data to RGB pixel data, according to an embodiment. In one embodiment, the conversion logic 1600 is implemented in display controller YUV overlay hardware in a graphics device. Such hardware is designed to perform near real-time conversion of buffered YUV data before the data is displayed on a display device configured to accept RGB data.

In one embodiment the conversion logic 1600 is able to simultaneously process multiple pixels or multiple groups of pixels during a single cycle. For each pixel, a register or buffer is loaded with YUV pixel data 1602. The incoming YUV pixel data 1602 can be stored in one of several formats, including planar YUV formats. The YUV pixel data 1602 can be unpacked from the YUV pixel data format by an unpack unit 1604. The unpack unit 1604 separates the YUV, data into separate Y, U, and V channels 1606. The separate Y, U, and V channels 1606 are processed by a color conversion unit 1608, which may be a specially configured arithmetic logic unit (ALU) configured to apply a matrix transformation of the YUV data into RGB data. In one embodiment the color conversion unit 1608 includes a coefficient selector unit 1610, which may be a register or input signal that configures the color conversion unit 1608 to select between logic configured to use one of multiple sets of color space coefficients, including the reduced error BT.601 and reduced error BT.709 coefficients described herein. In one embodiment the color conversion unit 1608 includes fixed function logic, such as adder and subtractor circuits, to compute a set of fixed point approximations of the specified (e.g., BT.601, BT.709) floating point color space conversion coefficients during the conversion of the YUV encoded image date to the RGB encoded image data. In one embodiment the color conversion unit 1608 outputs data in separate R, G, and B channels 1612. In one embodiment a re-pack unit 1614 re-packs the separate R, G, and B channels 1614 into a buffer or register containing RGB pixel data 1616. The RGB pixel data 1616 can be further postprocessed as needed before display on a display device.

Figure 17:
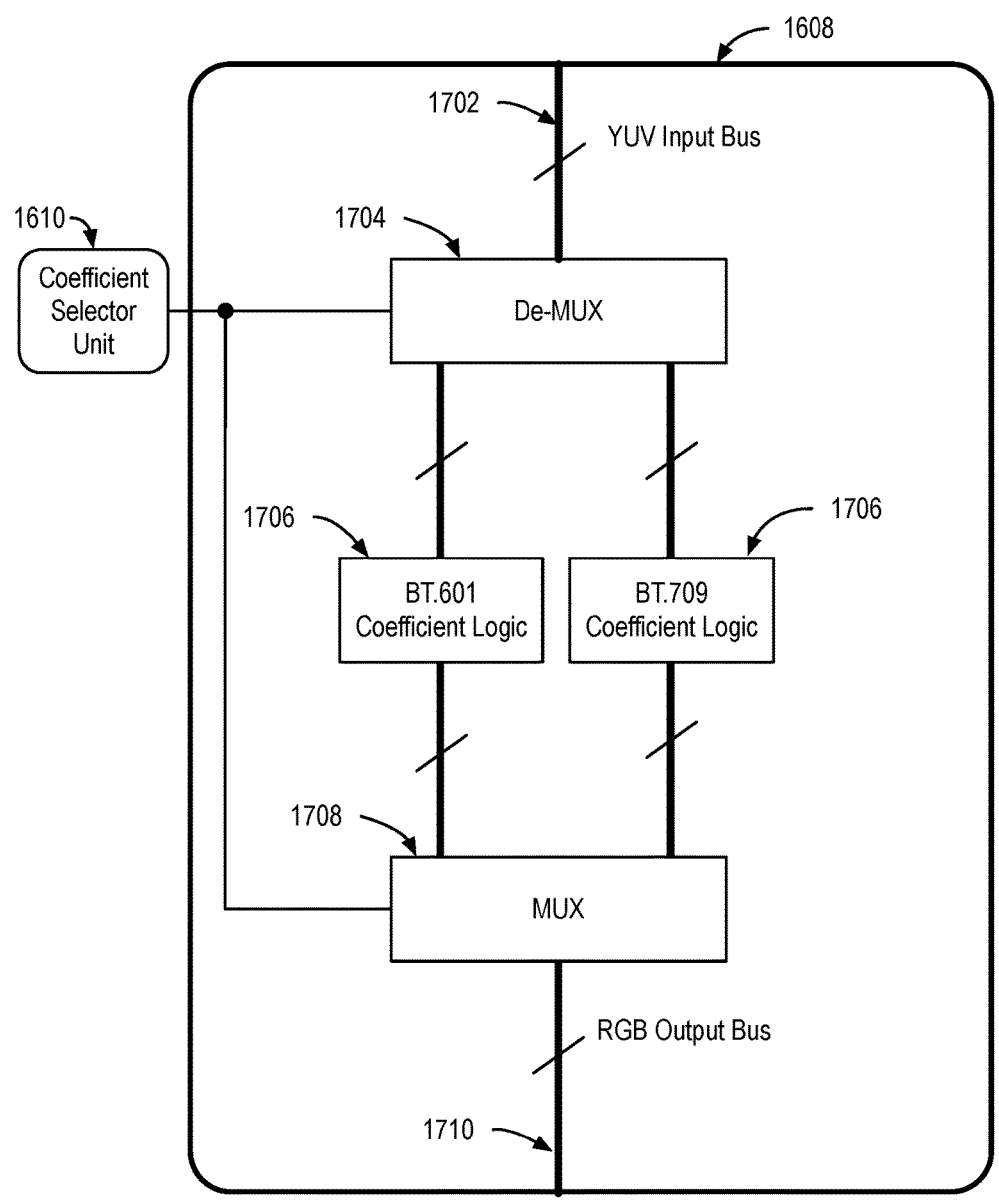
FIG. 17 is a block diagram of the color conversion unit, according to an embodiment.

FIG. 17 is a block diagram of the color conversion unit 1608, according to an embodiment. The illustrated block diagram is simplified and intended to provide a high level representative of the logic of the color conversion unit 1608 provided by one embodiment. The underlying details of the color conversion unit 1608 can vary among embodiments. In one embodiment the color conversion unit 1608 includes an input bus 1702 that receives YUV pixel data and an output bus 1710 that provides RGB pixel data. The coefficient selector unit 1610 can switch a de-multiplexer circuit 1704 that selects between BT.601 coefficient logic 1706 and BT.709 coefficient logic 1706, which each are implemented using a variant of the reduced error fixed point approximations described herein. Once the conversion is performed for the data, a multiplexer 1708 selects the output of the appropriate conversion logic to provide the output data to the RGB output bus 1710.

The color conversion unit can be configured to convert YUV data of varying formats to RGB data of varying formats. For example, the input YUV data can be selected from 32-bit AYUV (combined YUV and alpha), 16-bit YUV, or 12-bit YUV formats, including 4:4:4 sampled YUV and 4:2:2 or 4:2:0 subsampled YUV data. In one embodiment, by performing the appropriate scaling and offset transforms prior to conversion, YCbCr data may also be supported. Alternatively, color space conversion may be performed using fixed point approximations that may be used to directly convert from YCbCr. In one embodiment RGB data can be output in 24-bit (e.g., 8 bits per pixel) format, a 32-bit format including alpha data (e.g., RGBA, ARGB, etc.). In one embodiment the RGB data can be output in a 16-bit format (e.g., 565, 555, 444, etc.)

Figure 18:
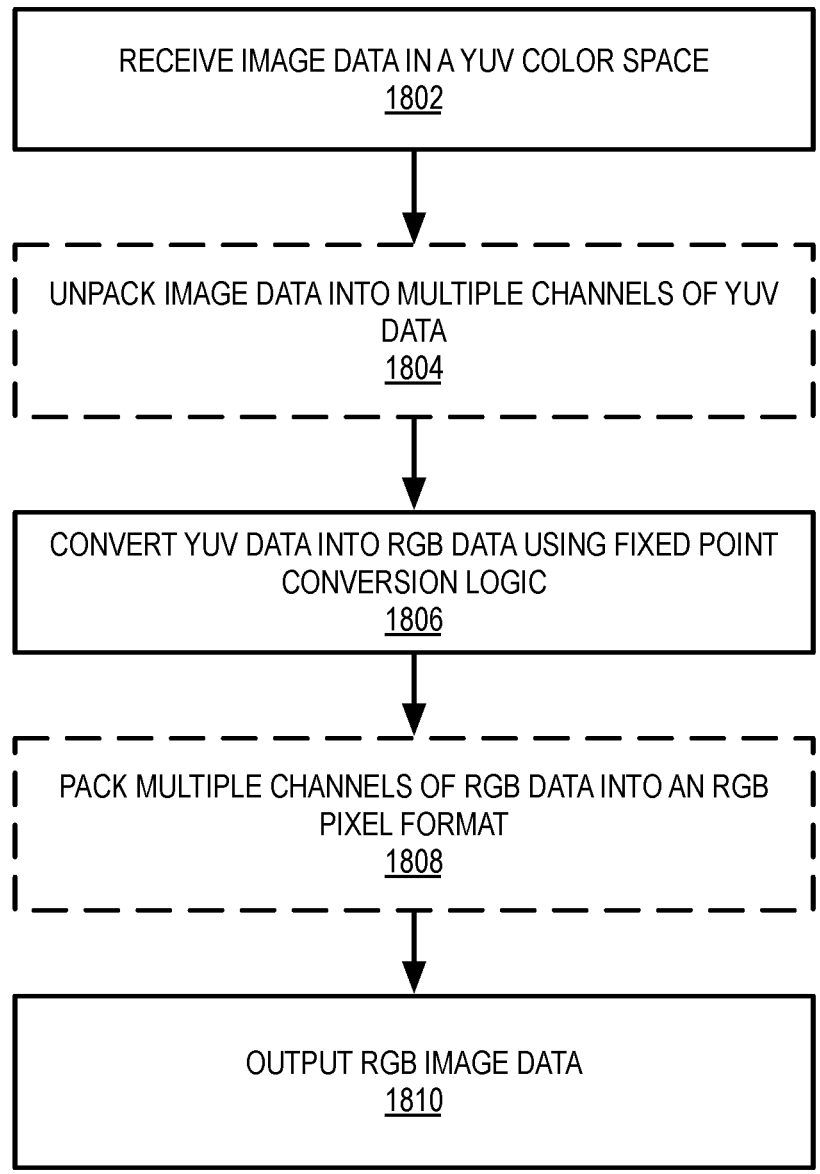
FIG. 18 is a flow diagram of YUV conversion logic, according to an embodiment.

FIG. 18 is a flow diagram of YUV conversion logic 1800, according to an embodiment. The YUV conversion logic can be performed by color conversion unit 1608 as in FIGS. 16-17. The YUV conversion logic 1800 can receive image data in a YUV color space, as shown at block 1802. At block 1806 the YUV conversion logic 1800 can convert the YUV data into RGB data using the reduced error fixed point conversion logic as described herein. The YUV conversion logic 1800 can then output the RGB image data at block 1810.

In one embodiment the YUV conversion logic 1800 can unpack image data into multiple channels of YUV data at block 1804 and/or pack multiple channels of RGB data into an RGB pixel format at block 1808 depending on the various input YUV formats and/or RGB output formats. For example, YUV image data may be planar YUV image data having luminance data stored in a Y plane and chrominance data stored in an interleaved UV. Such YUV data may be unpacked into a Y channel and a UV channel, which may be stored in separate buffers. RGB data may be packed into various RGB pixel formats at block 1808. Supported RGB pixel formats include but are not limited to pixel formats having 4, 8, 10, 12, or 16 bits per color channel and the R, G, and B channels may be arranged in differing orders for differing pixel formats.

Figure 19:
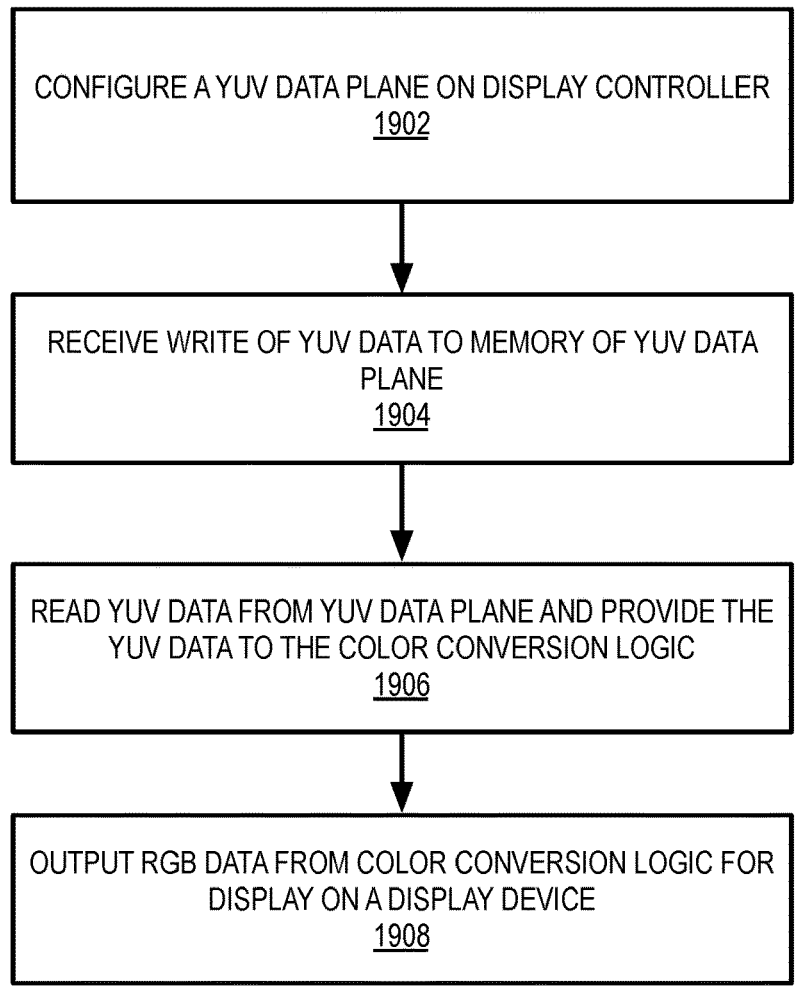
FIG. 19 is a block diagram of display controller YUV plane conversion logic, according to an embodiment.

FIG. 19 is a block diagram of display controller YUV plane conversion logic 1900, according to an embodiment. The YUV plane conversion logic 1900 can operate in a display engine or display controller, such as the display controller 211 of FIG. 2 or the display engine 840 of FIG. 8. In one embodiment at least a portion of the YUV plane conversion logic 1900 is performed by a graphics driver, such as the user mode graphics driver 1026 or kernel mode graphics driver 1029 of FIG. 10. The YUV plane conversion logic 1900 includes configuring a YUV data plane on a display controller, as shown at block 1902. The YUV data plane, in one embodiment, is a memory region that is mapped into memory accessible to the display controller or display engine and configured to accept the write of YUV data to be automatically converted to RGB data before output. In some implementations the YUV data plane is referred to as an overlay plane or a sprite plane. In one embodiment, configuring the YUV data plane includes enabling the YUV data plane and configuring the YUV format (e.g., planar, packed, etc.) for the data to be written to the YUV data plane.

At block 1904, the YUV plane conversion logic 1900 can receive a write of YUV data to memory of the YUV data plane. Periodically, for example, during each display refresh cycle, the YUV plane conversion logic 1900 can read the YUV data from the YUV data plane and provide the YUV data to the color conversion logic, as shown at block 1906. Thus, the YUV data is automatically converted to RGB data before output. As shown at block 1908, the YUV plane conversion logic 1900 can automatically output the RGB data from the color conversion logic for display on a display device. The RGB data can be output for display via a display connector of a graphics processor on which the YUV plane conversion logic 1900 is operative.

Figure 20:
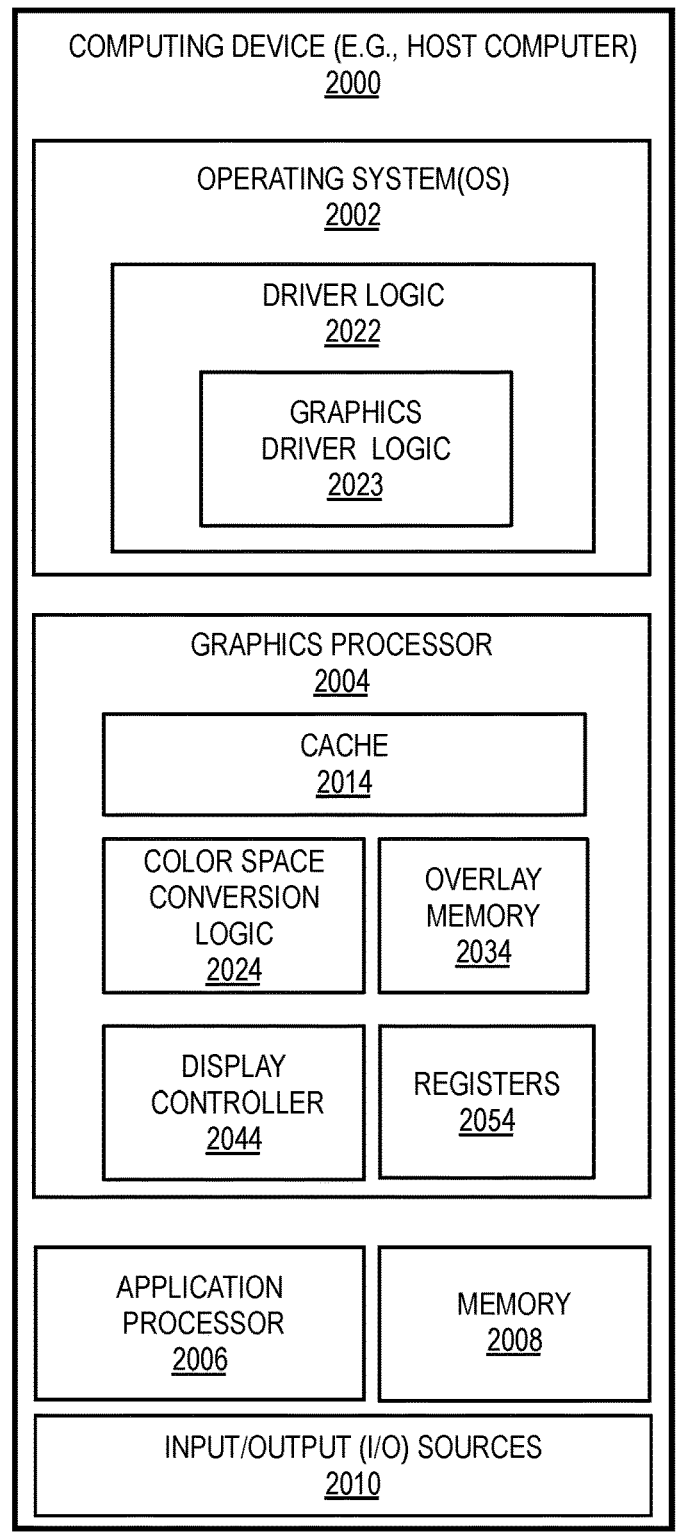
FIG. 20 is a block diagram of a computing device including a graphics processor having color space conversion logic, according to an embodiment.

FIG. 20 is a block diagram of a computing device 2000 including a graphics processor 2004 having color space conversion logic 2024, according to an embodiment. The computing device 2000 can be a computing device such as the data processing system 100 as in of FIG. 1. The computing device 2000 may also be or be included within a communication device such as a set-top box (e.g., Internet-based cable television set-top boxes, etc.), global positioning system (GPS)-based devices, etc. The computing device 2000 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2000 includes a mobile computing device employing an integrated circuit ("IC"), such as system on a chip ("SoC" or "SOC"), integrating various hardware and/or software components of computing device 2000 on a single chip.

The computing device 2000 includes a graphics processor 2004 having a display controller 2044. The display controller can be a variant of the display controller 302 of FIG. 3 and/or the display engine 840 of FIG. 8. The color space conversion logic 2024 can be the color conversion unit 1608 of FIGS. 16 and 17. The color space conversion logic 2024 can be used by, for example, a display controller 2044 of the graphics processor to convert YUV data to RGB color data. In one embodiment the YUV data can be stored in a region of overlay memory 2034 configured to receive YUV data. The overlay memory 2034 represents any type of display memory that can be configured to receive YUV data for automatic conversion to RGB data before display. The overlay memory 2034 can be used, for example, to receive video or image data in a YUV format, for example, from a media engine or a camera device. YUV data written to the overlay memory 2034 can be automatically converted to an RGB format by the display controller 2044 using the color space conversion logic 2024. A set of registers 2054 can also be included to store configuration settings for the display controller 2044 and the overlay memory 2034.

The graphics processor 2004 can additionally include a memory device configured as a cache 2014. In one embodiment the cache 2014 is the L3 data cache 1420 of FIG. 14. In one embodiment, the cache 2014 can also include an additional level of the memory hierarchy, such as a last level cache stored in the embedded memory module 218 of FIG. 2.

As illustrated, in one embodiment, in addition to a graphics processor 2004, the computing device 2000 may further include any number and type of hardware components and/or software components, such as (but not limited to) an application processor 2006, memory 2008, and input/output (I/O) sources 2010. The application processor 2006 can interact with a hardware graphics pipeline, as illustrated with reference to FIG. 3, to share graphics pipeline functionality. Processed data is stored in a buffer in the hardware graphics pipeline, and state information is stored in memory 2008. The resulting image is then transferred to the display controller 2044 for output via a display device, such as the display device 320 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user.

The application processor 2006 can include one or processors, such as processor(s) 102 of FIG. 1, and may be the central processing unit (CPU) that is used at least in part to execute an operating system (OS) 2002 for the computing device 2000. The OS 2002 can serve as an interface between hardware and/or physical resources of the computer device 2000 and a user. The OS 2002 can include driver logic 2022 for various hardware devices in the computing system 2000. The driver logic 2022 can include graphics driver logic 2023 such as the user mode graphics driver 1026 and/or kernel mode graphics driver 1029 of FIG. 10.

It is contemplated that in some embodiments, the graphics processor 2004 may exist as part of the application processor 2006 (such as part of a physical CPU package) in which case, at least a portion of the memory 2008 may be shared by the application processor 2006 and graphics processor 2004, although at least a portion of the memory 2008 may be exclusive to the graphics processor 2004, or the graphics processor 2004 may have a separate store of memory. The memory 2008 may comprise a pre-allocated region of a buffer (e.g., framebuffer); however, it should be understood by one of ordinary skill in the art that the embodiments are not so limited, and that any memory accessible to the lower graphics pipeline may be used. The memory 2008 may include various forms of random access memory (RAM) (e.g., SDRAM, SRAM, etc.) comprising an application that makes use of the graphics processor 2004 to render a desktop or 3D graphics scene. A memory controller hub, such as memory controller hub 116 of FIG. 1, may access data in the memory 2008 and forward it to graphics processor 2004 for graphics pipeline processing. The memory 2008 may be made available to other components within the computing device 2000. For example, any data (e.g., input graphics data) received from various I/O sources 2010 of the computing device 2000 can be temporarily queued into memory 2008 prior to their being operated upon by one or more processor(s) (e.g., application processor 2006) in the implementation of a software program or application. Similarly, data that a software program determines should be sent from the computing device 2000 to an outside entity through one of the computing system interfaces, or stored into an internal storage element, is often temporarily queued in memory 2008 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 2010 may include one or more I/O devices that are implemented for transferring data to and/or from the computing device 2000 (e.g., a networking adapter); or, for a large-scale non-volatile storage within the computing device 2000 (e.g., hard disk drive). User input devices, including alphanumeric and other keys, may be used to communicate information and command selections to graphics processor 2004. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 2000 may be employed to observe gestures, record audio and video and to receive and transmit visual and audio commands.

I/O sources 2010 configured as network interfaces can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2000 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

In general, embodiments provide for a graphics processing apparatus comprising a graphics processing unit including a hardware color conversion unit having fixed point logic to convert a pixel of YUV encoded image data into RGB encoded image data. In one embodiment the fixed point logic includes a set of fixed function logic circuits to compute a set of fixed point approximations of specified floating point color space conversion coefficients during the conversion of the YUV encoded image date to the RGB encoded image data. In one embodiment each fixed point approximation in the set of fixed point approximations has an approximation error of less than 1 percent.

One embodiment provides for a non-transitory machine readable medium storing data which, when read by one or more machines, causes the one or more machines to fabricate a system on a chip integrated circuit to convert image data in a YUV color space to image data in an RGB color space, the process comprising receiving the image data in the YUV color pace; converting the image data in the YUV color space to the image data in the RGB color space using color space conversion logic having fixed point approximations of floating point color space conversion coefficients, wherein the converting of the image data to the YUV color space includes computing a set of fixed point approximations of specified floating point color space conversion coefficients during the conversion of the YUV encoded image date to the RGB encoded image data; and outputting the image data in the RGB color space via a display output connector to a display device. In one embodiment, each fixed point approximation has an approximation error of less than 1 percent relative to the floating point color space conversion coefficients.

One embodiment provides for a system comprising a graphics processing unit including a color conversion unit having fixed point logic to convert YUV encoded image data to RGB encoded image data; and memory coupled to the graphics processing unit, the memory to store the YUV encoded image data before conversion to the RGB encoded image data, wherein the fixed point logic is configured to automatically convert the YUV encoded image data in the memory to the RGB encoded image data before the RGB encoded image data is output via a display connector.

In one embodiment, the set of fixed point approximations includes a first fixed point approximation comprising a first coefficient having a value of $1+(¼+⅛-1/256)$; a second coefficient having a value of $(¼+1/16+1/64+1/128)$; a third coefficient having a value of $(½+⅛+1/16+1/128+1/256)$; and a fourth coefficient having a value of $1+(½+⅛+1/16+1/32+1/128+1/256)$;

In one embodiment the set of fixed point approximations includes a second fixed point approximation comprising a first coefficient having a value of $1+(½+1/32+1/128)$; a second coefficient having a value of $(⅛+1/16-1/256)$; a third coefficient having a value of $½-(1/32+1/128+1/256)$; and a fourth coefficient having a value of $2-(⅛+1/16)$.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A graphics processing apparatus comprising:
a graphics processing unit including a color conversion unit having fixed point logic to automatically convert YUV encoded image data to RGB encoded image data, the fixed point logic including a set of fixed function logic circuits to compute a set of fixed point approximations of specified floating point color space conversion coefficients during the conversion of the YUV encoded image data to the RGB encoded image data; and
a display engine coupled to the color conversion unit, the display engine to output the automatically converted YUV encoded image data written to a memory region coupled to the graphics processing unit as the RGB encoded image data to a display device, wherein the display engine is a display controller including a register to select between multiple sets of fixed point approximations of the floating point color space conversion coefficients.

2. The graphics processing apparatus as in claim 1, wherein the set of fixed point approximations are to convert YUV encoded image data for digital video in a 4:2:2 sampling format or a 4:2:0 sampling format.

3. The graphics processing apparatus as in claim 1, wherein the set of fixed point approximations are consistent with international telecommunications union recommendation BT.601.

4. The graphics processing apparatus as in claim 3, wherein the set of fixed point approximations are implemented using between 16 and 26 logic circuits.

5. The graphics processing apparatus as in claim 4, wherein the set of fixed point approximations are implemented using 16 logic circuits.

6. The graphics processing apparatus as in claim 1, wherein the fixed point approximations are consistent with international telecommunications union recommendation BT.709.

7. The graphics processing apparatus as in claim 6, wherein the set of fixed point approximations are implemented using between 10 and 20 logic circuits.

8. The graphics processing apparatus as in claim 7, wherein the set of fixed point approximations are implemented using 10 logic circuits.

9. The graphics processing apparatus as in claim 1, wherein each fixed point approximation in the set of fixed point approximations has an approximation error of less than 1 percent relative to a corresponding floating point color space conversion coefficient of the specified floating point color space conversion coefficients.

10. A non-transitory machine readable medium storing data which, when read by one or more machines, causes the one or more machines to fabricate a system on a chip integrated circuit to perform a process to convert image data in a YUV color space to image data in an RGB color space, the process comprising:
receiving the image data in the YUV color space;
converting the image data in the YUV color space to the image data in the RGB color space using color space conversion logic having fixed point approximations of floating point color space includes computing a set of fixed point approximations of specified floating point color space conversion coefficients during the conversion of the YUV encoded image date to the RGB encoded image data, wherein converting the image data includes selecting between multiple sets of fixed point approximations of the floating point color space conversion coefficients; and
outputting the image data in the RGB color space via a display output connector to a display device.

11. The non-transitory machine readable medium of claim 10, the process additionally including unpacking the image data in the YUV color space into multiple channels of YUV data.

12. The non-transitory machine readable medium of claim 11, wherein the multiple channels of YUV data include a Y channel and an interleaved UV channel.

13. The non-transitory machine readable medium of claim 12, the process additionally including packing multiple channels of RGB data into an RGB output format.

14. The non-transitory machine readable medium of claim 10, wherein a first fixed point approximation includes:
- a first coefficient having a value of $1+(1/4+1/8-1/256)$;
- a second coefficient having a value of $(1/4+1/16+1/64+1/128)$;
- a third coefficient having a value of $(1/2+1/8+1/16+1/128+1/256)$; and
- a fourth coefficient having a value of $1+(1/2+1/8+1/16+1/32+1/128+1/256)$.

15. The non-transitory machine readable medium of claim 10, wherein a second fixed point approximation includes:
- a first coefficient having a value of $1+(1/2+1/32+1/128)$;
- a second coefficient having a value of $(1/8+1/16-1/256)$;
- a third coefficient having a value of $1/2-(1/32+1/128+1/256)$; and
- a fourth coefficient having a value of $2-(1/8+1/16)$.

16. A system comprising:
- a graphics processing unit including a color conversion unit having fixed point logic to convert YUV encoded image data to RGB encoded image data, the fixed point logic including a set of fixed function logic circuits to compute a set of fixed point approximations of specified floating point color space conversion coefficients during the conversion of the YUV encoded image date to the RGB encoded image data;
- memory coupled to the graphics processing unit, the memory to store the YUV encoded image data in the memory to the RGB encoded image data before the RGB encoded image data is output via a display connector; and
- a display engine coupled to the memory, the display engine to output the RGB encoded image data stored in the memory via the display connector, and wherein the display engine selects between multiple sets of fixed point approximations of the floating point color space conversion coefficients.

17. The system as in claim 16, wherein each fixed point approximation in the set of fixed point approximations has an approximation error of less than 1 percent relative to a corresponding floating point color space conversion coefficient.

18. The system as in claim 16, wherein the set of fixed point approximations includes a first fixed point approximation comprising:
- a first coefficient having a value of $1+(1/4+1/8-1/256)$;
- a second coefficient having a value of $(1/4+1/16+1/64+1/128)$;
- a third coefficient having a value of $(1/2+1/8+1/16+1/128+1/256)$; and
- a fourth coefficient having a value of $1+(1/2+1/8+1/16+1/32+1/128+1/256)$.

19. The system as in claim 16, wherein the set of fixed point approximations includes a second fixed point approximation comprising:
- a first coefficient having a value of $1+(1/2+1/32+1/128)$;
- a second coefficient having a value of $(1/8+1/16-1/256)$;
- a third coefficient having a value of $1/2-(1/32+1/128+1/256)$; and
- a fourth coefficient having a value of $2-(1/8+1/16)$.

* * * * *